US012810302B2

(12) United States Patent
Zhang et al.

(10) Patent No.: US 12,810,302 B2
(45) Date of Patent: Nov. 24, 2026

(54) METHOD, SYSTEM, AND COMPUTER PROGRAM PRODUCT FOR PROVIDING A TYPE AWARE TRANSFORMER FOR SEQUENTIAL DATASETS

(71) Applicant: Visa International Service Association, San Francisco, CA (US)

(72) Inventors: Dongyu Zhang, Worcester, MA (US); Liang Wang, San Jose, CA (US); Junpeng Wang, Santa Clara, CA (US); Xin Dai, Fremont, CA (US); Michael Yeh, Newark, CA (US); Yan Zheng, Los Gatos, CA (US); Wei Zhang, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 19/100,257

(22) PCT Filed: Mar. 25, 2024

(86) PCT No.: PCT/US2024/021303
§ 371 (c)(1),
(2) Date: Jan. 31, 2025

(87) PCT Pub. No.: WO2024/197299
PCT Pub. Date: Sep. 26, 2024

(65) Prior Publication Data
US 2025/0259180 A1 Aug. 14, 2025

Related U.S. Application Data
(60) Provisional application No. 63/454,089, filed on Mar. 23, 2023.

(51) Int. Cl.
*G06Q 40/00* (2023.01)
*G06N 20/00* (2019.01)
*G06Q 20/40* (2012.01)

(52) U.S. Cl.
CPC ......... *G06Q 20/4016* (2013.01); *G06N 20/00* (2019.01)

(58) Field of Classification Search
CPC ........................... G06Q 20/4016; G06N 20/00
See application file for complete search history.

(56) References Cited

U.S. PATENT DOCUMENTS 11,062,221 B1 * 7/2021 Landi ..................... G06N 5/025
11,153,314 B2 10/2021 Zhang et al.
(Continued)

FOREIGN PATENT DOCUMENTS

CN 110520874 A 11/2019
CN 115098763 * 9/2022 ............. G06N 3/049
(Continued)

OTHER PUBLICATIONS

Anna Leontjeva et al., Combining Static and Dynamic Features for Multivariate Sequence Classification, 2016 IEEE International Conference on Data Science and Advanced Analytics, 2016 (Year: 2016).*
(Continued)

*Primary Examiner* — Abhishek Vyas
*Assistant Examiner* — William B. Bunker
(74) *Attorney, Agent, or Firm* — The Webb Law Firm

(57) ABSTRACT

Provided are methods that include receiving interaction data associated with a plurality of interactions, the interaction data including interaction records that include a plurality of fields including a static field and a dynamic field, generating a static interaction embedding representation based on static field data associated with the static field and a first trans-
(Continued)

former model, generating a plurality of dynamic interaction embedding representations based on dynamic field data associated with the dynamic field of a sequence of interaction records and a second transformer model, generating a first intermediate input and a plurality of second intermediate inputs, generating a static sequence embedding representation and dynamic sequence embedding representations based on a third transformer model, and generating at least one prediction based on inputting the static sequence embedding representation and the plurality of dynamic sequence embedding representations to a machine learning model. Systems and computer program products are also disclosed.

20 Claims, 12 Drawing Sheets

(56) References Cited

U.S. PATENT DOCUMENTS

| | | | | |
|---|---|---|---|---|
| 11,416,751 | B2 | 8/2022 | Ambati et al. | |
| 11,429,823 | B1 | 8/2022 | Lan et al. | |
| 11,526,680 | B2 | 12/2022 | Ravi et al. | |
| 2019/0147462 | A1* | 5/2019 | Ray | G06Q 30/0202 705/7.31 |
| 2020/0211020 | A1 | 7/2020 | Allbright et al. | |
| 2020/0293878 | A1 | 9/2020 | Bhaskar et al. | |
| 2021/0312451 | A1 | 10/2021 | Allbright et al. | |
| 2022/0101327 | A1 | 3/2022 | Arora et al. | |
| 2022/0254152 | A1* | 8/2022 | Min | G06N 3/047 |
| 2022/0374891 | A1 | 11/2022 | Zhang et al. | |
| 2023/0169587 | A1* | 6/2023 | Gao | G06N 3/08 705/38 |
| 2024/0303730 | A1* | 9/2024 | Gao | G06N 7/01 |
| 2024/0356945 | A1* | 10/2024 | Kumar | H04L 63/1425 |
| 2026/0017589 | A1* | 1/2026 | Surapaneni | G06N 5/022 |

FOREIGN PATENT DOCUMENTS

| | | | | |
|---|---|---|---|---|
| WO | WO-2007090605 A1 * | 8/2007 | G06Q 20/4016 |
| WO | WO-2018191301 A1 * | 10/2018 | G06N 3/044 |
| WO | WO-2019229528 A2 * | 12/2019 | G16H 50/70 |
| WO | 2022008677 A1 | 1/2022 | |
| WO | 2022099296 A1 | 5/2022 | |

OTHER PUBLICATIONS

Markus B. Beissinger, "Deep Generative Networks for Sequence Prediction," arXiv: 1804.06546v1 [cs.LG] 2018 (Year: 2018).*
Li et al., "A Time Attention based Fraud Transaction Detection Framework," arXiv:1912.11760v2 [cs.LG] 2020 (Year: 2020).*
Zhu et al., S3VAE: Self-Supervised Sequential VAE for Representation Disentanglement and Data Generation, IEEE Conference on Computer Vision and Pattern Recognition,2020 (Year: 2020).*
Altman, "Synthesizing credit card transactions", In Proceedings of the Second ACM International Conference on AI in Finance, 2021.
Arik et al., "Tabnet: Attentive interpretable tabular learning", In Proceedings of the AAAI conference on artificial intelligence, 2021, pp. 6679-6687, vol. 35, No. 8.
Badaro et al., "Transformers for tabular data representation: A tutorial on models and applications", Proceedings of the VLDB Endowment, 2022, pp. 3746-3749, vol. 15, No. 12.
Borisov et al., "Deep neural networks and tabular data: A survey", IEEE transactions on neural networks and learning systems (2022), pp. 7499-7519.
Branco et al., "Interleaved sequence RNNs for fraud detection", In Proceedings of the 26th ACM SIGKDD international conference on knowledge discovery & data mining, 2020, pp. 3101-3109.
Chen et al., "Behavior sequence transformer for e-commerce recommendation in alibaba", In Proceedings of the 1st international workshop on deep learning practice for high-dimensional sparse data, 2019, pp. 1-4.
Chen et al., "Denoising self-attentive sequential recommendation", In Proceedings of the 16th ACM Conference on Recommender Systems, 2022, pp. 92-101.
Chen et al., "Time lag aware sequential recommendation", In Proceedings of the 31st ACM International Conference on Information & Knowledge Management, 2022, pp. 212-221.
Cho et al., "Learning phrase representations using RNN encoder-decoder for statistical machine translation", arXiv preprint arXiv:1406.1078 (2014).
De Souza Pereira Moreira et al., "Transformers4rec: Bridging the gap between nlp and sequential/session- based recommendation", In Proceedings of the 15th ACM conference on recommender systems, 2021, pp. 143-153.
Devlin, "Bert: Pre-training of deep bidirectional transformers for language understanding", arXiv preprint arXiv:1810.04805 (2018).
Dosovitskiy, "An image is worth 16x16 words: Transformers for image recognition at scale.," arXiv preprint arXiv:2010.11929 (2020).
Fiedler, "Simple modifications to improve tabular neural networks", arXiv preprint arXiv:2108.03214 (2021).
Friedman, "Greedy function approximation: a gradient boosting machine", Annals of statistics (2001), pp. 1189-1232.
Gorshniy et al., "On embeddings for numerical features in tabular deep learning", Advances in Neural Information Processing Systems, 2022, pp. 24991-25004, vol. 35.
Gorshniy et al., "Revisiting deep learning models for tabular data." Advances in Neural Information Processing Systems 2021, pp. 18932-18943, vol. 34.
Grinstajin et al., "Why do tree-based models still outperform deep learning on typical tabular data?", Advances in neural information processing systems, 2022, pp. 507-520, vol. 35.
Han et al., "LUNA: language understanding with number augmentations on transformers via number plugins and pre-training", arXiv preprint arXiv:2212.02691 (2022).
Herzig et al., "TaPas: Weakly supervised table parsing via pre-training", arXiv preprint arXiv:2004.02349 (2020).
Hidasi, "Session-based Recommendations with Recurrent Neural Networks", arXiv preprint arXiv:1511.06939 (2015).
Hochreiter, "Long Short-term Memory", Neural Computation MIT-Press, 1997, pp. 1735-1780, vol. 9, No. 8.
Huang et al., "Tabtransformer: Tabular data modeling using contextual embeddings.", arXiv preprint arXiv:2012.06678 (2020).
Jannach et al., "Why are deep learning models not consistently winning recommender systems competitions yet? A position paper", In Proceedings of the Recommender Systems Challenge 2020, pp. 44-49.
Kang et al., "Self-attentive sequential recommendation", In 2018 IEEE international conference on data mining (ICDM), IEEE, 2018, pp. 197-206.
Kaufman et al., "Leakage in data mining: Formulation, detection, and avoidance", ACM Transactions on Knowledge Discovery from Data (TKDD), 2012, pp. 1-21, vol. 6, No. 4.
Ke et al., "Lightgbm: A highly efficient gradient boosting decision tree", Advances in neural information processing systems, 2017, pp. 1-9, vol. 30.
Kingma, "Adam: A method for stochastic optimization", arXiv preprint arXiv:1412.6980 (2014).
Levin et al., "Transfer learning with deep tabular models", arXiv preprint arXiv:2206. 15306 (2022).
Li et al., "Time interval aware self-attention for sequential recommendation", In Proceedings of the 13th international conference on web search and data mining, 2020, pp. 322-330.
Li et al., "Transaction fraud detection using GRU-centered sandwich-structured model", In 2018 IEEE 22nd International Conference on Computer Supported Cooperative Work in Design ((CSCWD)), IEEE, 2018, pp. 467-472.
Lipton, "A Critical Review of Recurrent Neural Networks for Sequence Learning", arXiv Preprint, CoRR, abs/1506.00019 (2015).
Luetto et al., "One transformer for all time series: Representing and training with time-dependent heterogeneous tabular data", arXiv preprint arXiv:2302.06375 (2023).
Muhamed et al., "CTR-BERT: Cost-effective knowledge distillation for billion-parameter teacher models", In NeurIPS Efficient Natural Language and Speech Processing Workshop. 2021.

(56) References Cited

OTHER PUBLICATIONS

Ni et al., "Justifying recommendations using distantly-labeled reviews and fine-grained aspects", In Proceedings of the 2019 conference on empirical methods in natural language processing and the 9th international joint conference on natural language processing (EMNLP-IJCNLP), 2019, pp. 188-197.
Padhi et al., "Tabular transformers for modeling multivariate time series", In ICASSP 2021-2021 IEEE International Conference on Acoustics, Speech and Signal Processing (ICASSP), IEEE, 2021, pp. 3565-3569.
Paszke et al., "Pytorch: An imperative style, high-performance deep learning library", Advances in neural information processing systems, 2019, pp. 1-12, vol. 32.
Rubachev et al., "Revisiting pretraining objectives for tabular deep learning", arXiv preprint arXiv:2207.03208 (2022).
Shwartz-Ziv et al., "Tabular data: Deep learning is not all you need", Information Fusion 2022, pp. 84-90, vol. 81.
Sompealli et al., "Saint: Improved neural networks for tabular data via row attention and contrastive pre-training", arXiv preprint arXiv:2106.01342 (2021).
Song et al., "Autoint: Automatic feature interaction learning via self-attentive neural networks", In Proceedings of the 28th ACM international conference on information and knowledge management, 2019, pp. 1161-1170.
Sun et al., "BERT4Rec: Sequential recommendation with bidirectional encoder representations from transformer", In Proceedings of the 28th ACM international conference on information and knowledge management, 2019, pp. 1441-1450.
Vaswani et al., "Attention is all you need", Advances in Neural Information Processing Systems, 2017, pp. 1-15. tems, 2020, pp. 328-337.
Wu et al., "SSE-PT: Sequential recommendation via personalized transformer", In Proceedings of the 14th ACM conference on recommender systems, 2020, pp. 328-337.
Yin et al., "TaBERT: Pretraining for joint understanding of textual and tabular data", arXiv preprint arXiv:2005.08314 (2020).
Yu et al., "A dynamic recurrent model for next basket recommendation", In Proceedings of the 39th International ACM SIGIR conference on Research and Development in Information Retrieval, 2016, pp. 729-732.
Zhang et al., "Feature-level deeper self-attention network for sequential recommendation." In IJCAI, 2019, pp. 4320-4326.
Zhang et al., "Sequential click prediction for sponsored search with recurrent neural networks", In Proceedings of the AAAI conference on artificial intelligence, 2014, pp. 1369-1375, vol. 28, No. 1.
Zhang et al., "Time-aware transformer-based network for clinical notes series prediction", In Machine learning for healthcare conference, PMLR, 2020, pp. 566-588.
Zhang et al., "Deep learning based recommender system: A survey and new perspectives", ACM computing surveys (CSUR), 2019, pp. 1-38, vol. 52, No. 1.
Zhou et al., "S3-rec: Self-supervised learning for sequential recommendation with mutual information maximization", In Proceedings of the 29th ACM international conference on information & knowledge management, 2020, pp. 1893-1902.
Zhuang et al., "Attributed sequence embedding", In 2019 IEEE International Conference on Big Data (Big Data), IEEE, 2019, pp. 1723-1728.

* cited by examiner

METHOD, SYSTEM, AND COMPUTER PROGRAM PRODUCT FOR PROVIDING A TYPE AWARE TRANSFORMER FOR SEQUENTIAL DATASETS

CROSS REFERENCE TO RELATED APPLICATIONS

This application is the United States national phase of International Application No. PCT/US24/21303, filed Mar. 25, 2024, and claims priority to U.S. Provisional Patent Application No. 63/454,089, filed Mar. 23, 2023, the disclosures of which are hereby incorporated by reference in their entireties.

BACKGROUND

1. Technical Field

This disclosure relates generally to transformer machine learning models and, in some non-limiting embodiments or aspects, to methods, systems, and computer program products for providing a transformer machine learning model that is data type aware for sequential datasets.

2. Technical Considerations

Some machine learning models, such as neural networks (e.g., a convolutional neural network), may receive an input dataset including data points for training. Each data point in the training dataset may have a different effect on a neural network (e.g., a trained neural network) generated based on training the neural network after the neural network is trained. In some instances, input datasets designed for neural networks may be independent and identically distributed. Input datasets that are independent and identically distributed may be used to determine an effect (e.g., an influence) of each data point of the input dataset.

A transformer machine learning model may refer to a deep learning model that is designed to process sequential input data and includes a self-attention mechanism, which gives different weight to the significance of each part of the sequential input data. The transformer machine learning model may process an entirety of input data all at once and the attention mechanism may provide context for any position of the sequential input data.

An embedding (e.g., a neural embedding) may refer to a relatively low dimensional space into which high-dimensional vectors, such as feature vectors, can be translated. In some examples, the embedding may include a vector that has values which represent relationships of the semantics and the syntactic of sequential input data by placing semantically similar inputs closer together in an embedding space. In some instances, embeddings may improve the performance of machine learning techniques on large inputs, such as sparse vectors representing words. For example, embeddings may be learned and reused across machine learning models.

However, if input data types, such as dynamic and static data types, of the sequential input data are provided to a transformer machine learning and are not properly considered, information that does not change may be replicated upon every instance of data in the sequential input data. Accordingly, the static information may consume a lot of resources (e.g., memory space, processing power, etc.) with regard to the transformer machine learning model. Further, the static information may reduce difficulty during a model training (e.g., pre-training) task, to the extent that the static information can prevent the transformer machine learning model from learning meaningful representations for the sequential input data.

SUMMARY

Accordingly, provided are improved methods, systems, and computer program products for providing a transformer machine learning model that is data type aware for sequential datasets (e.g., that overcome some or all of the deficiencies identified above).

According to non-limiting embodiments or aspects, provided is a computer-implemented method for providing a transformer machine learning model that is data type aware for sequential datasets. An example method may include receiving interaction data associated with a plurality of interactions, the interaction data comprising a plurality of interaction records. Each interaction record of the plurality of interaction records may include a plurality of fields including at least one static field and at least one dynamic field. A static interaction embedding representation may be generated based on inputting static field data associated with the at least one static field to a first transformer model. A plurality of dynamic interaction embedding representations may be generated based on inputting dynamic field data associated with the at least one dynamic field of a sequence of interaction records to a second transformer model. The sequence of interaction records may include at least a subset of the plurality of interaction records. A first intermediate input may be generated based on the static interaction embedding representation, a first time-based embedding representation, and a first field-type embedding representation associated with the at least one static field. A plurality of second intermediate inputs may be generated based on each dynamic interaction embedding representation, a respective time-based embedding representation, and a second field-type embedding representation associated with the at least one dynamic field. A static sequence embedding representation may be generated based on inputting the first intermediate input to a third transformer model. A plurality of dynamic sequence embedding representations may be generated based on inputting the plurality of second intermediate inputs to the third transformer model. At least one prediction may be generated based on inputting the static sequence embedding representation and the plurality of dynamic sequence embedding representations to a machine learning model.

In some non-limiting embodiments or aspects, generating the first intermediate input may include combining the static interaction embedding representation, the first time-based embedding representation, and the first field-type embedding representation associated with the at least one static field.

In some non-limiting embodiments or aspects, generating the plurality of dynamic interaction embedding representations may include generating a first dynamic interaction embedding associated with a first interaction record based on inputting first dynamic field data associated with the at least one dynamic field of the first interaction record to the second transformer model and/or generating a second dynamic interaction embedding associated with a second interaction record based on inputting second dynamic field data associated with the at least one dynamic field of the second interaction record to the second transformer model. A first time-based embedding representation associated with the first interaction record may be generated, and/or a second time-based embedding representation associated with the second interaction record may be generated. Generating the plurality of second intermediate inputs may include combining the first dynamic interaction embedding, the first time-based embedding representation, and the second field-type embedding representation associated with the at least one dynamic field and/or combining the second dynamic interaction embedding, the second time-based embedding representation, and the second field-type embedding representation associated with the at least one dynamic field.

In some non-limiting embodiments or aspects, combining the first dynamic interaction embedding, the first time-based embedding representation, and the second field-type embedding representation associated with the at least one dynamic field may include summing the first dynamic interaction embedding, the first time-based embedding representation, and the second field-type embedding representation associated with the at least one dynamic field. In some non-limiting embodiments or aspects, combining the second dynamic interaction embedding, the second time-based embedding representation, and the second field-type embedding representation associated with the at least one dynamic field may include summing the second dynamic interaction embedding, the second time-based embedding representation, and the second field-type embedding representation associated with the at least one dynamic field.

In some non-limiting embodiments or aspects, for each interaction record of the plurality of interaction records, the static field data associated with the at least one static field may be separated from the dynamic field data associated with the at least one dynamic field. A first input for the first transformer model may be generated based on the static field data associated with the at least one static field. A second input for the second transformer model may be generated based on the dynamic field data associated with the at least one dynamic field.

In some non-limiting embodiments or aspects, the at least one dynamic field may include a plurality of dynamic fields. An original value of a dynamic field of a first interaction record of the sequence of interaction records may be masked to provide a masked dynamic field of the first interaction record prior to inputting dynamic field data associated with the plurality of dynamic fields of the sequence of interaction records to the second transformer model. Generating the plurality of dynamic interaction embedding representations based on inputting the dynamic field data associated with the plurality of dynamic fields of the sequence of interaction records to the second transformer model may include generating the plurality of dynamic interaction embedding representations based on inputting the masked dynamic field of the first interaction record to the second transformer model. The third transformer model may be trained by comparing a data value of a data field of a dynamic sequence embedding representation associated with the first interaction record provided by the third transformer model with the original value of the dynamic field of the first interaction record and adjusting a parameter of the third transformer model based on comparing the data value of the data field of the dynamic sequence embedding representation associated with the first interaction record provided by the third transformer model with the original value of the dynamic field of the first interaction record.

In some non-limiting embodiments or aspects, an action associated with a fraud detection task may be performed based on the at least one prediction.

According to non-limiting embodiments or aspects, provided is a system for providing a transformer machine learning model that is data type aware for sequential datasets. An example system may include at least one processor configured to receive interaction data associated with a plurality of interactions, the interaction data comprising a plurality of interaction records. Each interaction record of the plurality of interaction records may include a plurality of fields including at least one static field and at least one dynamic field. A static interaction embedding representation may be generated based on inputting static field data associated with the at least one static field to a first transformer model. A plurality of dynamic interaction embedding representations may be generated based on inputting dynamic field data associated with the at least one dynamic field of a sequence of interaction records to a second transformer model. The sequence of interaction records may include at least a subset of the plurality of interaction records. A first intermediate input may be generated based on the static interaction embedding representation, a first time-based embedding representation, and a first field-type embedding representation associated with the at least one static field. A plurality of second intermediate inputs may be generated based on each dynamic interaction embedding representation, a respective time-based embedding representation, and a second field-type embedding representation associated with the at least one dynamic field. A static sequence embedding representation may be generated based on inputting the first intermediate input to a third transformer model. A plurality of dynamic sequence embedding representations may be generated based on inputting the plurality of second intermediate inputs to the third transformer model. At least one prediction may be generated based on inputting the static sequence embedding representation and the plurality of dynamic sequence embedding representations to a machine learning model.

In some non-limiting embodiments or aspects, generating the first intermediate input may include combining the static interaction embedding representation, the first time-based embedding representation, and the first field-type embedding representation associated with the at least one static field.

In some non-limiting embodiments or aspects, generating the plurality of dynamic interaction embedding representations may include generating a first dynamic interaction embedding associated with a first interaction record based on inputting first dynamic field data associated with the at least one dynamic field of the first interaction record to the second transformer model and/or generating a second dynamic interaction embedding associated with a second interaction record based on inputting second dynamic field data associated with the at least one dynamic field of the second interaction record to the second transformer model. A first time-based embedding representation associated with the first interaction record may be generated, and/or a second time-based embedding representation associated with the second interaction record may be generated. Generating the plurality of second intermediate inputs may include combining the first dynamic interaction embedding, the first time-based embedding representation, and the second field-type embedding representation associated with the at least one dynamic field and/or combining the second dynamic interaction embedding, the second time-based embedding representation, and the second field-type embedding representation associated with the at least one dynamic field.

In some non-limiting embodiments or aspects, combining the first dynamic interaction embedding, the first time-based embedding representation, and the second field-type embedding representation associated with the at least one dynamic field may include summing the first dynamic interaction embedding, the first time-based embedding representation, and the second field-type embedding representation associated with the at least one dynamic field. In some non-limiting embodiments or aspects, combining the second dynamic interaction embedding, the second time-based embedding representation, and the second field-type embedding representation associated with the at least one dynamic field may include summing the second dynamic interaction embedding, the second time-based embedding representation, and the second field-type embedding representation associated with the at least one dynamic field.

In some non-limiting embodiments or aspects, for each interaction record of the plurality of interaction records, the static field data associated with the at least one static field may be separated from the dynamic field data associated with the at least one dynamic field. A first input for the first transformer model may be generated based on the static field data associated with the at least one static field. A second input for the second transformer model may be generated based on the dynamic field data associated with the at least one dynamic field.

In some non-limiting embodiments or aspects, the at least one dynamic field may include a plurality of dynamic fields. An original value of a dynamic field of a first interaction record of the sequence of interaction records may be masked to provide a masked dynamic field of the first interaction record prior to inputting dynamic field data associated with the plurality of dynamic fields of the sequence of interaction records to the second transformer model. Generating the plurality of dynamic interaction embedding representations based on inputting the dynamic field data associated with the plurality of dynamic fields of the sequence of interaction records to the second transformer model may include generating the plurality of dynamic interaction embedding representations based on inputting the masked dynamic field of the first interaction record to the second transformer model. The third transformer model may be trained by comparing a data value of a data field of a dynamic sequence embedding representation associated with the first interaction record provided by the third transformer model with the original value of the dynamic field of the first interaction record and adjusting a parameter of the third transformer model based on comparing the data value of the data field of the dynamic sequence embedding representation associated with the first interaction record provided by the third transformer model with the original value of the dynamic field of the first interaction record.

In some non-limiting embodiments or aspects, an action associated with a fraud detection task may be performed based on the at least one prediction.

According to non-limiting embodiments or aspects, provided is a computer program product for providing a transformer machine learning model that is data type aware for sequential datasets. An example computer program product may include at least one non-transitory computer-readable medium including program instructions that, when executed by at least one processor, cause the at least one processor to receive interaction data associated with a plurality of interactions, the interaction data comprising a plurality of interaction records. Each interaction record of the plurality of interaction records may include a plurality of fields including at least one static field and at least one dynamic field. A static interaction embedding representation may be generated based on inputting static field data associated with the at least one static field to a first transformer model. A plurality of dynamic interaction embedding representations may be generated based on inputting dynamic field data associated with the at least one dynamic field of a sequence of interaction records to a second transformer model. The sequence of interaction records may include at least a subset of the plurality of interaction records. A first intermediate input may be generated based on the static interaction embedding representation, a first time-based embedding representation, and a first field-type embedding representation associated with the at least one static field. A plurality of second intermediate inputs may be generated based on each dynamic interaction embedding representation, a respective time-based embedding representation, and a second field-type embedding representation associated with the at least one dynamic field. A static sequence embedding representation may be generated based on inputting the first intermediate input to a third transformer model. A plurality of dynamic sequence embedding representations may be generated based on inputting the plurality of second intermediate inputs to the third transformer model. At least one prediction may be generated based on inputting the static sequence embedding representation and the plurality of dynamic sequence embedding representations to a machine learning model.

In some non-limiting embodiments or aspects, generating the first intermediate input may include combining the static interaction embedding representation, the first time-based embedding representation, and the first field-type embedding representation associated with the at least one static field.

In some non-limiting embodiments or aspects, generating the plurality of dynamic interaction embedding representations may include generating a first dynamic interaction embedding associated with a first interaction record based on inputting first dynamic field data associated with the at least one dynamic field of the first interaction record to the second transformer model and/or generating a second dynamic interaction embedding associated with a second interaction record based on inputting second dynamic field data associated with the at least one dynamic field of the second interaction record to the second transformer model. A first time-based embedding representation associated with the first interaction record may be generated, and/or a second time-based embedding representation associated with the second interaction record may be generated. Generating the plurality of second intermediate inputs may include combining the first dynamic interaction embedding, the first time-based embedding representation, and the second field-type embedding representation associated with the at least one dynamic field and/or combining the second dynamic interaction embedding, the second time-based embedding representation, and the second field-type embedding representation associated with the at least one dynamic field.

In some non-limiting embodiments or aspects, combining the first dynamic interaction embedding, the first time-based embedding representation, and the second field-type embedding representation associated with the at least one dynamic field may include summing the first dynamic interaction embedding, the first time-based embedding representation, and the second field-type embedding representation associated with the at least one dynamic field. In some non-limiting embodiments or aspects, combining the second dynamic interaction embedding, the second time-based embedding representation, and the second field-type embedding representation associated with the at least one dynamic field may include summing the second dynamic interaction embedding, the second time-based embedding representation, and the second field-type embedding representation associated with the at least one dynamic field.

In some non-limiting embodiments or aspects, for each interaction record of the plurality of interaction records, the static field data associated with the at least one static field may be separated from the dynamic field data associated with the at least one dynamic field. A first input for the first transformer model may be generated based on the static field data associated with the at least one static field. A second input for the second transformer model may be generated based on the dynamic field data associated with the at least one dynamic field.

In some non-limiting embodiments or aspects, the at least one dynamic field may include a plurality of dynamic fields. An original value of a dynamic field of a first interaction record of the sequence of interaction records may be masked to provide a masked dynamic field of the first interaction record prior to inputting dynamic field data associated with the plurality of dynamic fields of the sequence of interaction records to the second transformer model. Generating the plurality of dynamic interaction embedding representations based on inputting the dynamic field data associated with the plurality of dynamic fields of the sequence of interaction records to the second transformer model may include generating the plurality of dynamic interaction embedding representations based on inputting the masked dynamic field of the first interaction record to the second transformer model. The third transformer model may be trained by comparing a data value of a data field of a dynamic sequence embedding representation associated with the first interaction record provided by the third transformer model with the original value of the dynamic field of the first interaction record and adjusting a parameter of the third transformer model based on comparing the data value of the data field of the dynamic sequence embedding representation associated with the first interaction record provided by the third transformer model with the original value of the dynamic field of the first interaction record.

In some non-limiting embodiments or aspects, an action associated with a fraud detection task may be performed based on the at least one prediction.

Further non-limiting embodiments or aspects are set forth in the following numbered clauses:

Clause 1: A computer-implemented method, comprising: receiving, with at least one processor, interaction data associated with a plurality of interactions, the interaction data comprising a plurality of interaction records, each interaction record of the plurality of interaction records comprising a plurality of fields comprising at least one static field and at least one dynamic field; generating, with at least one processor, a static interaction embedding representation based on inputting static field data associated with the at least one static field to a first transformer model; generating, with at least one processor, a plurality of dynamic interaction embedding representations based on inputting dynamic field data associated with the at least one dynamic field of a sequence of interaction records to a second transformer model, the sequence of interaction records comprising at least a subset of the plurality of interaction records; generating, with at least one processor, a first intermediate input based on the static interaction embedding representation, a first time-based embedding representation, and a first field-type embedding representation associated with the at least one static field; generating, with at least one processor, a plurality of second intermediate inputs based on each dynamic interaction embedding representation, a respective time-based embedding representation, and a second field-type embedding representation associated with the at least one dynamic field; generating, with at least one processor, a static sequence embedding representation based on inputting the first intermediate input to a third transformer model; generating, with at least one processor, a plurality of dynamic sequence embedding representations based on inputting the plurality of second intermediate inputs to the third transformer model; and generating, with at least one processor, at least one prediction based on inputting the static sequence embedding representation and the plurality of dynamic sequence embedding representations to a machine learning model.

Clause 2: The computer-implemented method of clause 1, wherein generating the first intermediate input comprises: combining the static interaction embedding representation, the first time-based embedding representation, and the first field-type embedding representation associated with the at least one static field.

Clause 3: The computer-implemented method of clause 1 or clause 2, wherein generating the plurality of dynamic interaction embedding representations comprises: generating a first dynamic interaction embedding associated with a first interaction record based on inputting first dynamic field data associated with the at least one dynamic field of the first interaction record to the second transformer model; and generating a second dynamic interaction embedding associated with a second interaction record based on inputting second dynamic field data associated with the at least one dynamic field of the second interaction record to the second transformer model; the computer-implemented method further comprising: generating a first time-based embedding representation associated with the first interaction record; and generating a second time-based embedding representation associated with the second interaction record; and wherein generating the plurality of second intermediate inputs comprises: combining the first dynamic interaction embedding, the first time-based embedding representation, and the second field-type embedding representation associated with the at least one dynamic field; and combining the second dynamic interaction embedding, the second time-based embedding representation, and the second field-type embedding representation associated with the at least one dynamic field.

Clause 4: The computer-implemented method of any of clauses 1-3, wherein combining the first dynamic interaction embedding, the first time-based embedding representation, and the second field-type embedding representation associated with the at least one dynamic field comprises: summing the first dynamic interaction embedding, the first time-based embedding representation, and the second field-type embedding representation associated with the at least one dynamic field; and wherein combining the second dynamic interaction embedding, the second time-based embedding representation, and the second field-type embedding representation associated with the at least one dynamic field comprises: summing the second dynamic interaction embedding, the second time-based embedding representation, and the second field-type embedding representation associated with the at least one dynamic field.

Clause 5: The computer-implemented method of any of clauses 1-4, further comprising: separating, for each interaction record of the plurality of interaction records, the static field data associated with the at least one static field from the dynamic field data associated with the at least one dynamic field; generating a first input for the first transformer model based on the static field data associated with the at least one static field; and generating a second input for the second transformer model based on the dynamic field data associated with the at least one dynamic field.

Clause 6: The computer-implemented method of any of clauses 1-5, wherein the at least one dynamic field comprises a plurality of dynamic fields, the method further comprising: masking an original value of a dynamic field of a first interaction record of the sequence of interaction records to provide a masked dynamic field of the first interaction record prior to inputting dynamic field data associated with the plurality of dynamic fields of the sequence of interaction records to the second transformer model; wherein generating the plurality of dynamic interaction embedding representations based on inputting the dynamic field data associated with the plurality of dynamic fields of the sequence of interaction records to the second transformer model comprises: generating the plurality of dynamic interaction embedding representations based on inputting the masked dynamic field of the first interaction record to the second transformer model; and wherein the computer-implemented method further comprises: training the third transformer model by comparing a data value of a data field of a dynamic sequence embedding representation associated with the first interaction record provided by the third transformer model with the original value of the dynamic field of the first interaction record and adjusting a parameter of the third transformer model based on comparing the data value of the data field of the dynamic sequence embedding representation associated with the first interaction record provided by the third transformer model with the original value of the dynamic field of the first interaction record.

Clause 7: The computer-implemented method of any of clauses 1-6, further comprising: performing an action associated with a fraud detection task based on the at least one prediction.

Clause 8: A system, comprising: at least one processor configured to: receive interaction data associated with a plurality of interactions, the interaction data comprising a plurality of interaction records, each interaction record of the plurality of interaction records comprising a plurality of fields comprising at least one static field and at least one dynamic field; generate a static interaction embedding representation based on inputting static field data associated with the at least one static field to a first transformer model; generate a plurality of dynamic interaction embedding representations based on inputting dynamic field data associated with the at least one dynamic field of a sequence of interaction records to a second transformer model, the sequence of interaction records comprising at least a subset of the plurality of interaction records; generate a first intermediate input based on the static interaction embedding representation, a first time-based embedding representation, and a first field-type embedding representation associated with the at least one static field; generate a plurality of second intermediate inputs based on each dynamic interaction embedding representation, a respective time-based embedding representation, and a second field-type embedding representation associated with the at least one dynamic field; generate a static sequence embedding representation based on inputting the first intermediate input to a third transformer model; generate a plurality of dynamic sequence embedding representations based on inputting the plurality of second intermediate inputs to the third transformer model; and generate at least one prediction based on inputting the static sequence embedding representation and the plurality of dynamic sequence embedding representations to a machine learning model.

Clause 9: The system of clause 8, wherein generating the first intermediate input comprises: combining the static interaction embedding representation, the first time-based embedding representation, and the first field-type embedding representation associated with the at least one static field.

Clause 10: The system of clause 8 or clause 9, wherein generating the plurality of dynamic interaction embedding representations comprises: generating a first dynamic interaction embedding associated with a first interaction record based on inputting first dynamic field data associated with the at least one dynamic field of the first interaction record to the second transformer model; and generating a second dynamic interaction embedding associated with a second interaction record based on inputting second dynamic field data associated with the at least one dynamic field of the second interaction record to the second transformer model; and wherein the at least one processor is further configured to: generate a first time-based embedding representation associated with the first interaction record; and generate a second time-based embedding representation associated with the second interaction record; and wherein generating the plurality of second intermediate inputs comprises: combining the first dynamic interaction embedding, the first time-based embedding representation, and the second field-type embedding representation associated with the at least one dynamic field; and combining the second dynamic interaction embedding, the second time-based embedding representation, and the second field-type embedding representation associated with the at least one dynamic field.

Clause 11: The system of any of clauses 8-10, wherein combining the first dynamic interaction embedding, the first time-based embedding representation, and the second field-type embedding representation associated with the at least one dynamic field comprises: summing the first dynamic interaction embedding, the first time-based embedding representation, and the second field-type embedding representation associated with the at least one dynamic field; and wherein combining the second dynamic interaction embedding, the second time-based embedding representation, and the second field-type embedding representation associated with the at least one dynamic field comprises: summing the second dynamic interaction embedding, the second time-based embedding representation, and the second field-type embedding representation associated with the at least one dynamic field.

Clause 12: The system of any of clauses 8-11, wherein the at least one processor is further configured to: separate, for each interaction record of the plurality of interaction records, the static field data associated with the at least one static field from the dynamic field data associated with the at least one dynamic field; generate a first input for the first transformer model based on the static field data associated with the at least one static field; and generate a second input for the second transformer model based on the dynamic field data associated with the at least one dynamic field.

Clause 13: The system of any of clauses 8-12, wherein the at least one dynamic field comprises a plurality of dynamic fields, and wherein the at least one processor is further configured to: mask an original value of a dynamic field of a first interaction record of the sequence of interaction records to provide a masked dynamic field of the first interaction record prior to inputting dynamic field data associated with the plurality of dynamic fields of the sequence of interaction records to the second transformer model; wherein generating the plurality of dynamic interaction embedding representations based on inputting the dynamic field data associated with the plurality of dynamic fields of the sequence of interaction records to the second transformer model comprises: generating the plurality of dynamic interaction embedding representations based on inputting the masked dynamic field of the first interaction record to the second transformer model; and wherein the at least one processor is further configured to: train the third transformer model by comparing a data value of a data field of a dynamic sequence embedding representation associated with the first interaction record provided by the third transformer model with the original value of the dynamic field of the first interaction record and adjusting a parameter of the third transformer model based on comparing the data value of the data field of the dynamic sequence embedding representation associated with the first interaction record provided by the third transformer model with the original value of the dynamic field of the first interaction record.

Clause 14: The system of any of clauses 8-13, wherein the at least one processor is further configured to: perform an action associated with a fraud detection task based on the at least one prediction.

Clause 15: A computer program product comprising at least one non-transitory computer-readable medium including program instructions that, when executed by at least one processor, cause the at least one processor to: receive interaction data associated with a plurality of interactions, the interaction data comprising a plurality of interaction records, each interaction record of the plurality of interaction records comprising a plurality of fields comprising at least one static field and at least one dynamic field; generate a static interaction embedding representation based on inputting static field data associated with the at least one static field to a first transformer model; generate a plurality of dynamic interaction embedding representations based on inputting dynamic field data associated with the at least one dynamic field of a sequence of interaction records to a second transformer model, the sequence of interaction records comprising at least a subset of the plurality of interaction records; generate a first intermediate input based on the static interaction embedding representation, a first time-based embedding representation, and a first field-type embedding representation associated with the at least one static field; generate a plurality of second intermediate inputs based on each dynamic interaction embedding representation, a respective time-based embedding representation, and a second field-type embedding representation associated with the at least one dynamic field; generate a static sequence embedding representation based on inputting the first intermediate input to a third transformer model; generate a plurality of dynamic sequence embedding representations based on inputting the plurality of second intermediate inputs to the third transformer model; and generate at least one prediction based on inputting the static sequence embedding representation and the plurality of dynamic sequence embedding representations to a machine learning model.

Clause 16: The computer program product of clause 15, wherein generating the first intermediate input comprises: combining the static interaction embedding representation, the first time-based embedding representation, and the first field-type embedding representation associated with the at least one static field.

Clause 17: The computer program product of clause 15 or clause 16, wherein generating the plurality of dynamic interaction embedding representations comprises: generating a first dynamic interaction embedding associated with a first interaction record based on inputting first dynamic field data associated with the at least one dynamic field of the first interaction record to the second transformer model; and generating a second dynamic interaction embedding associated with a second interaction record based on inputting second dynamic field data associated with the at least one dynamic field of the second interaction record to the second transformer model; wherein the instructions, when executed by the at least one processor, further cause the at least one processor to: generate a first time-based embedding representation associated with the first interaction record; and generate a second time-based embedding representation associated with the second interaction record; wherein generating the plurality of second intermediate inputs comprises: combining the first dynamic interaction embedding, the first time-based embedding representation, and the second field-type embedding representation associated with the at least one dynamic field; and combining the second dynamic interaction embedding, the second time-based embedding representation, and the second field-type embedding representation associated with the at least one dynamic field; wherein combining the first dynamic interaction embedding, the first time-based embedding representation, and the second field-type embedding representation associated with the at least one dynamic field comprises: summing the first dynamic interaction embedding, the first time-based embedding representation, and the second field-type embedding representation associated with the at least one dynamic field; and wherein combining the second dynamic interaction embedding, the second time-based embedding representation, and the second field-type embedding representation associated with the at least one dynamic field comprises: summing the second dynamic interaction embedding, the second time-based embedding representation, and the second field-type embedding representation associated with the at least one dynamic field.

Clause 18: The computer program product of any of clauses 15-17, wherein the instructions, when executed by the at least one processor, further cause the at least one processor to: separate, for each interaction record of the plurality of interaction records, the static field data associated with the at least one static field from the dynamic field data associated with the at least one dynamic field; generate a first input for the first transformer model based on the static field data associated with the at least one static field; and generate a second input for the second transformer model based on the dynamic field data associated with the at least one dynamic field.

Clause 19: The computer program product of any of clauses 15-18, wherein the at least one dynamic field comprises a plurality of dynamic fields, and wherein the instructions, when executed by the at least one processor, further cause the at least one processor to: mask an original value of a dynamic field of a first interaction record of the sequence of interaction records to provide a masked dynamic field of the first interaction record prior to inputting dynamic field data associated with the plurality of dynamic fields of the sequence of interaction records to the second transformer model; wherein generating the plurality of dynamic interaction embedding representations based on inputting the dynamic field data associated with the plurality of dynamic fields of the sequence of interaction records to the second transformer model comprises: generating the plurality of dynamic interaction embedding representations based on inputting the masked dynamic field of the first interaction record to the second transformer model; and wherein the instructions, when executed by the at least one processor, further cause the at least one processor to: train the third transformer model by comparing a data value of a data field of a dynamic sequence embedding representation associated with the first interaction record provided by the third transformer model with the original value of the dynamic field of the first interaction record and adjusting a parameter of the third transformer model based on comparing the data value of the data field of the dynamic sequence embedding representation associated with the first interaction record provided by the third transformer model with the original value of the dynamic field of the first interaction record.

Clause 20: The computer program product of any of clauses 15-19, wherein the instructions, when executed by the at least one processor, further cause the at least one processor to: perform an action associated with a fraud detection task based on the at least one prediction.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter.

BRIEF DESCRIPTION OF THE DRAWINGS

Additional advantages and details are explained in greater detail below with reference to the non-limiting, exemplary embodiments or aspects that are illustrated in the accompanying schematic figures, in which.

DETAILED DESCRIPTION

Figure 1:
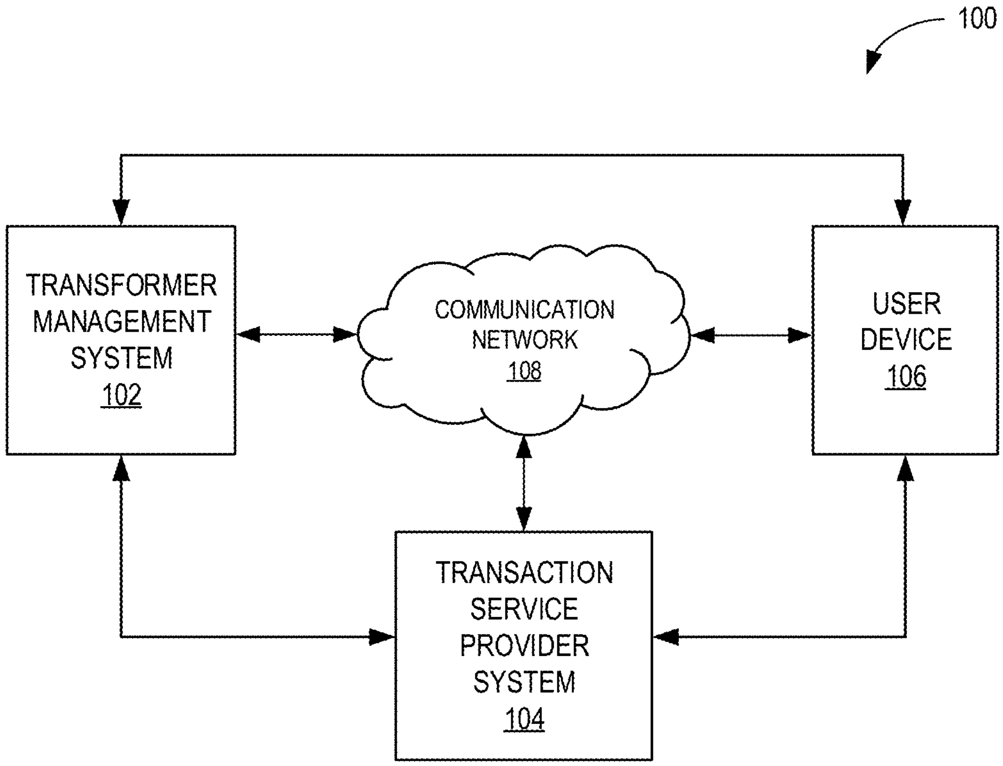
FIG. 1 is a schematic diagram of a system for a transformer machine learning model that is data type aware for sequential datasets, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects of the disclosed subject matter. Hence, specific dimensions and other physical characteristics related to the embodiments or aspects disclosed herein are not to be considered as limiting.

Some non-limiting embodiments or aspects may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term “account identifier” may include one or more primary account numbers (PANs), payment tokens, or other identifiers associated with a customer account. The term “payment token” may refer to an identifier that is used as a substitute or replacement identifier for an original account identifier, such as a PAN. Account identifiers may be alphanumeric or any combination of characters and/or symbols. Payment tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of payment tokens for different individuals or purposes.

As used herein, the terms “client” and “client device” may refer to one or more client-side devices or systems (e.g., remote from a transaction service provider) used to initiate or facilitate a transaction (e.g., a payment transaction). As an example, a “client device” may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a “client” may also refer to an entity (e.g., a merchant, an acquirer, and/or the like) that owns, utilizes, and/or operates a client device for initiating transactions (e.g., for initiating transactions with a transaction service provider).

As used herein, the term “communication” may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term “computing device” may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term “issuer institution” may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term “issuer system” refers to one or more computer devices operated by or on behalf of an issuer institution, such as a server computer executing one or more software applications. For example, an issuer system may include one or more authorization servers for authorizing a transaction.

As used herein, the term “merchant” may refer to an individual or entity that provides goods and/or services, or access to goods and/or services, to customers based on a transaction, such as a payment transaction. The term “merchant” or “merchant system” may also refer to one or more computer systems operated by or on behalf of a merchant, such as a server computer executing one or more software applications.

As used herein, a “point-of-sale (POS) device” may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like. As used herein, a “point-of-sale (POS) system” may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the term “payment device” may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices and/or components of such (e.g., processors, servers, client devices, software applications, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

Non-limiting embodiments or aspects of the disclosed subject matter are directed to methods, systems, and computer program products for providing a transformer machine learning model that is data type aware for sequential datasets. In some non-limiting embodiments or aspects, a transformer management system may include at least one processor programmed or configured to receive interaction data associated with a plurality of interactions, the interaction data comprising a plurality of interaction records, each interaction record of the plurality of interaction records comprising a plurality of fields comprising at least one static field and at least one dynamic field; generate a static interaction embedding representation based on inputting static field data associated with the at least one static field to a first transformer model; generate a plurality of dynamic interaction embedding representations based on inputting dynamic field data associated with the at least one dynamic field of a sequence of interaction records to a second transformer model, the sequence of interaction records comprising at least a subset of the plurality of interaction records; generate a first intermediate input based on the static interaction embedding representation, a first time-based embedding representation, and a first field-type embedding representation associated with the at least one static field; generate a plurality of second intermediate inputs based on each dynamic interaction embedding representation, a respective time-based embedding representation, and a second field-type embedding representation associated with the at least one dynamic field; generate a static sequence embedding representation based on inputting the first intermediate input to a third transformer model; generate a plurality of dynamic sequence embedding representations based on inputting the plurality of second intermediate inputs to the third transformer model; and generate at least one prediction based on inputting the static sequence embedding representation and the plurality of dynamic sequence embedding representations to a machine learning model.

In this way, the transformer management system may prevent static information in the sequential input data from consuming an inordinate amount of resources with regard to transformer machine learning models that are used during training and/or during production. Further, the static information may reduce difficulty during a model training (e.g., pre-training) task, to the extent that the static information can prevent the transformer machine learning model from learning meaningful representations for the sequential input data.

For the purpose of illustration, in the following description, while the presently disclosed subject matter is described with respect to methods, systems, and computer program products for a transformer machine learning model that is data type aware for sequential datasets, e.g., for payment transactions, one skilled in the art will recognize that the disclosed subject matter is not limited to the non-limiting embodiments or aspects disclosed herein. For example, the methods, systems, and computer program products described herein may be used with a wide variety of settings, such as a transformer machine learning model that is data type aware for any suitable type of sequential dataset and/or for making determinations (e.g., predictions, classifications, regressions, and/or the like) with at least one machine learning model based on the sequential dataset, such as for fraud detection/prevention, authorization, authentication, identification, feature selection, product recommendation, click through recommendation (CTR), and/or the like.

Referring now to FIG. 1, shown is a schematic diagram of a system 100 for a transformer machine learning model that is data type aware for sequential datasets, according to some non-limiting embodiments or aspects. As shown in FIG. 1, system 100 may include transformer management system 102, transaction service provider system 104, user device 106, and communication network 108. Transformer management system 102, transaction service provider system 104, and/or user device 106 may interconnect (e.g., establish a connection to communicate) via wired connections, wireless connections, or a combination of wired and wireless connections, such as communication network 108 and/or the like.

Transformer management system 102 may include one or more devices configured to communicate with transaction service provider system 104 and/or user device 106 (e.g., directly, indirectly via communication network 108, and/or the like). For example, transformer management system 102 may include at least one computing device, such as a server, a group of servers, and/or other like devices. In some non-limiting embodiments or aspects, transformer management system 102 may be associated with a transaction service provider. For example, transformer management system 102 may be operated by the transaction service provider. In some non-limiting embodiments or aspects, transformer management system 102 may be a component of transaction service provider system 104. In some non-limiting embodiments or aspects, transformer management system 102 may be in communication with a data storage device, which may be local or remote to transformer management system 102. In some non-limiting embodiments or aspects, transformer management system 102 may be capable of receiving information from, storing information in, transmitting information to, and/or searching information stored in the data storage device.

Transaction service provider system 104 may include one or more devices configured to communicate with transformer management system 102 and/or user device 106 (e.g., directly, indirectly via communication network 108, and/or the like). For example, transaction service provider system 104 may include at least one computing device, such as a server, a group of servers, and/or other like devices. In some non-limiting embodiments or aspects, transaction service provider system 104 may be associated with a transaction service provider.

User device 106 may include a computing device configured to communicate with transformer management system 102 and/or transaction service provider system 104 (e.g., directly, indirectly via communication network 108, and/or the like). For example, user device 106 may include a computing device, such as a desktop computer, a portable computer (e.g., tablet computer, a laptop computer, and/or the like), a mobile device (e.g., a cellular phone, a smartphone, a personal digital assistant, a wearable device, and/or the like), and/or other like devices. In some non-limiting embodiments or aspects, user device 106 may be associated with a user (e.g., an individual operating user device 106).

Communication network 108 may include one or more wired and/or wireless networks. For example, communication network 108 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems and devices shown in FIG. 1 are provided as an example. There may be additional systems and/or devices, fewer systems and/or devices, different systems and/or devices, and/or differently arranged systems and/or devices than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of system 100 may perform one or more functions described as being performed by another set of systems or another set of devices of system 100.

Figure 2:
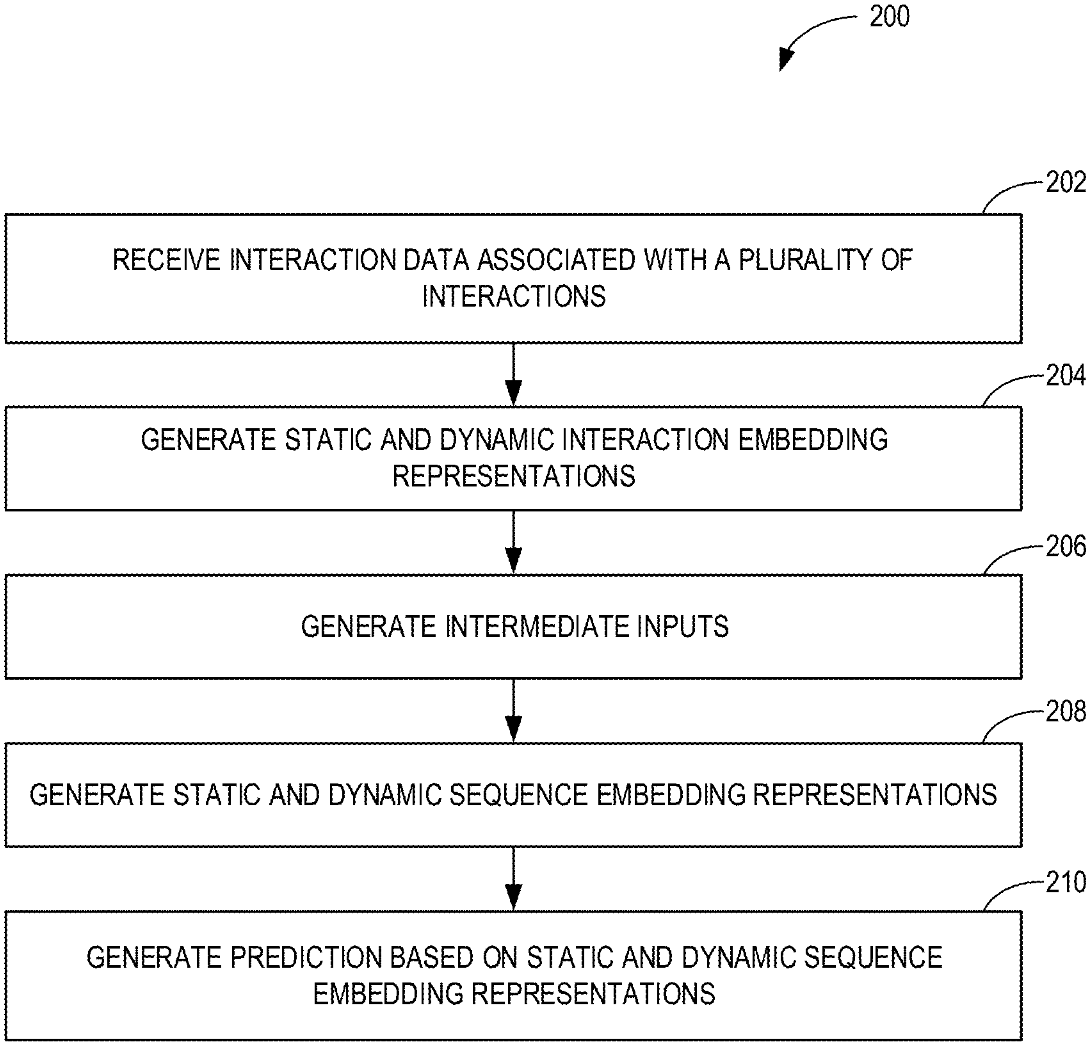
FIG. 2 is a flow diagram of a method for a transformer machine learning model that is data type aware for sequential datasets, according to some non-limiting embodiments or aspects.

Referring now to FIG. 2, shown is a flow diagram of a method 200 for a transformer machine learning model that is data type aware for sequential datasets, according to some non-limiting embodiments or aspects. The steps shown in FIG. 2 are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step. In some non-limiting embodiments or aspects, one or more of the steps of process 200 may be performed (e.g., completely, partially, etc.) by transformer management system 102 (e.g., one or more devices of transformer management system 102). In some non-limiting embodiments or aspects, one or more of the steps of process 200 may be performed (e.g., completely, partially, etc.) by another device or a group of devices separate from or including transformer management system 102 (e.g., one or more devices of transformer management system 102), transaction service provider system 104 (e.g., one or more devices of transaction service provider system 104), and/or user device 106.

As shown in FIG. 2, at step 202, method 200 may include receiving interaction data associated with a plurality of interactions. For example, transformer management system 102 may receive interaction data associated with a plurality of interactions. In some non-limiting embodiments, the interaction data may include a plurality of interaction records (e.g., a plurality of transaction records). Each interaction record of the plurality of interaction records may include a plurality of fields comprising at least one static field and at least one dynamic field.

Figure 5A:
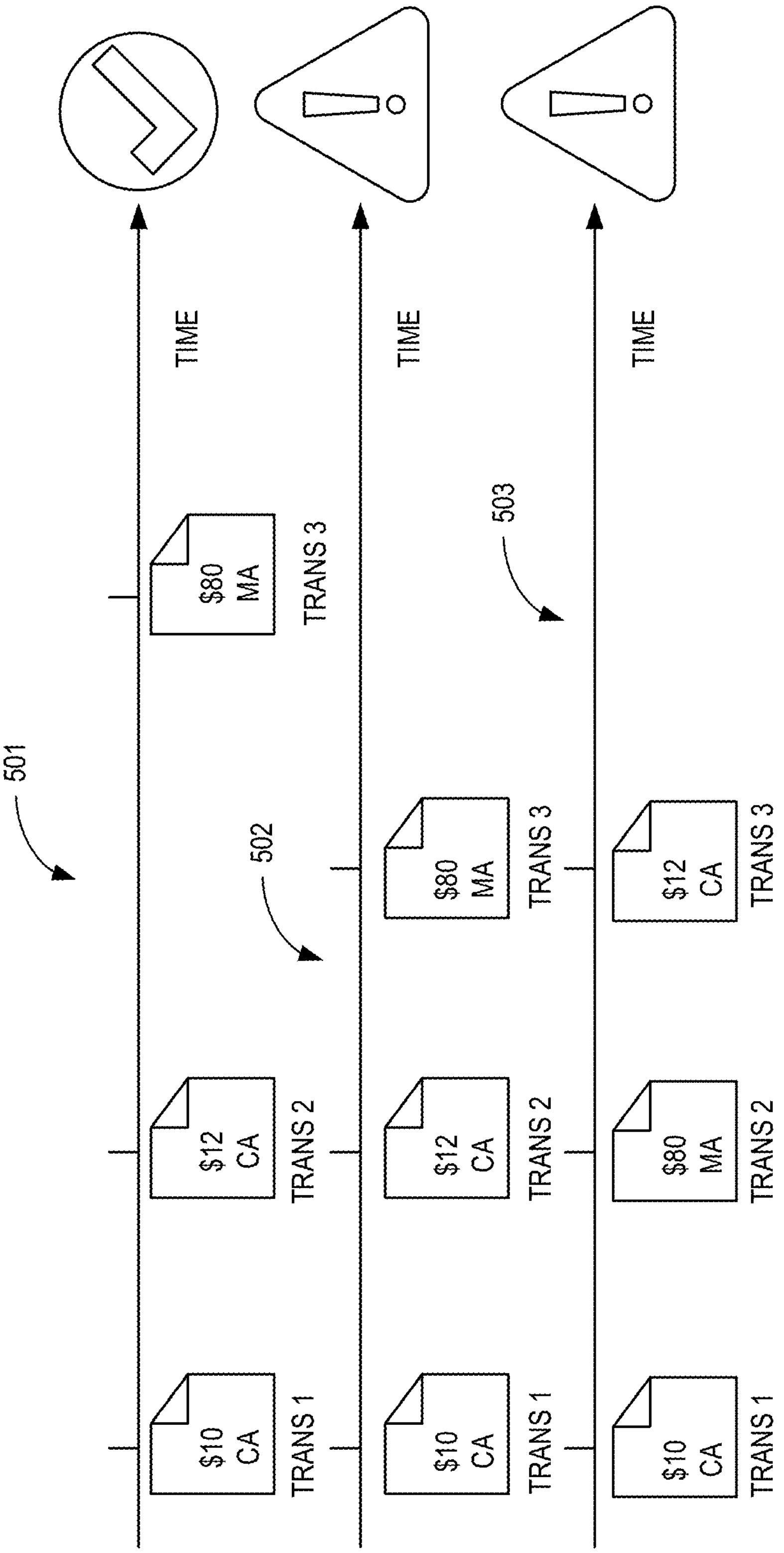
FIG. 5A is a schematic diagram of example sequential datasets, according to some non-limiting embodiments or aspects.

For the purpose of illustration, referring now to FIG. 5A and with continued reference to FIG. 2, FIG. 5A shows a schematic diagram of example sequential datasets, according to some non-limiting embodiments or aspects. As shown in FIG. 5A, first sequential dataset 501 may include a plurality of interactions (e.g., payment transactions associated with a first user). For example, first payment transaction Trans 1 may be associated with a payment transaction for $10 in California (CA). Second payment transaction Trans 2 may be associated with a payment transaction for $12 in CA, and second payment transaction Trans 2 may have occurred a relatively small amount of time after first payment transaction Trans 1. Third payment transaction Trans 3 may be associated with a payment transaction for $80 in Massachusetts (MA), and third payment transaction Trans 3 may have occurred a relatively large amount of time after second payment transaction Trans 2. In this example, first sequential dataset 501 may be normal (e.g., not detected as fraudulent and/or the like) because there was sufficient time for a user to travel from CA to MA.

As shown in FIG. 5A, second sequential dataset 502 may include a plurality of interactions (e.g., payment transactions associated with a second user). For example, first payment transaction Trans 1 may be associated with a payment transaction for $10 in CA. Second payment transaction Trans 2 may be associated with a payment transaction for $12 in CA, and second payment transaction Trans 2 may have occurred a relatively small amount of time after first payment transaction Trans 1. Third payment transaction Trans 3 may be associated with a payment transaction for $80 in MA, and third payment transaction Trans 3 may have occurred a relatively small amount of time after second payment transaction Trans 2. In this example, second sequential dataset 502 may be abnormal (e.g., detected as fraudulent and/or the like) because there was insufficient time for a user to travel from CA to MA.

As shown in FIG. 5A, third sequential dataset 503 may include a plurality of interactions (e.g., payment transactions associated with a third user). For example, first payment transaction Trans 1 may be associated with a payment transaction for $10 in CA. Second payment transaction Trans 2 may be associated with a payment transaction for $80 in MA, and second payment transaction Trans 2 may have occurred a relatively small amount of time after first payment transaction Trans 1. Third payment transaction Trans 3 may be associated with a payment transaction for $12 in CA, and third payment transaction Trans 3 may have occurred a relatively small amount of time after second payment transaction Trans 2. In this example, third sequential dataset 503 may be abnormal (e.g., detected as fraudulent and/or the like) because there was insufficient time for a user to travel from CA to MA and back to CA.

As shown in the examples of FIG. 5A, certain field values (e.g., transaction amount, state/location, etc.) may be the same in all of first sequential dataset 501, second sequential dataset 502, and third sequential dataset 503, but the relative timing of the interactions (e.g., payment transactions) may be different. For example, abnormal second and/or third transactions in second sequential dataset 502 and third sequential dataset 503 may not be detected based solely on those certain field values (e.g., without consideration of timing). As such, these examples demonstrate that time (e.g., temporal information) and order (e.g., sequential information) may be significant in detecting abnormalities (e.g., fraud, etc.).

Figure 5B:
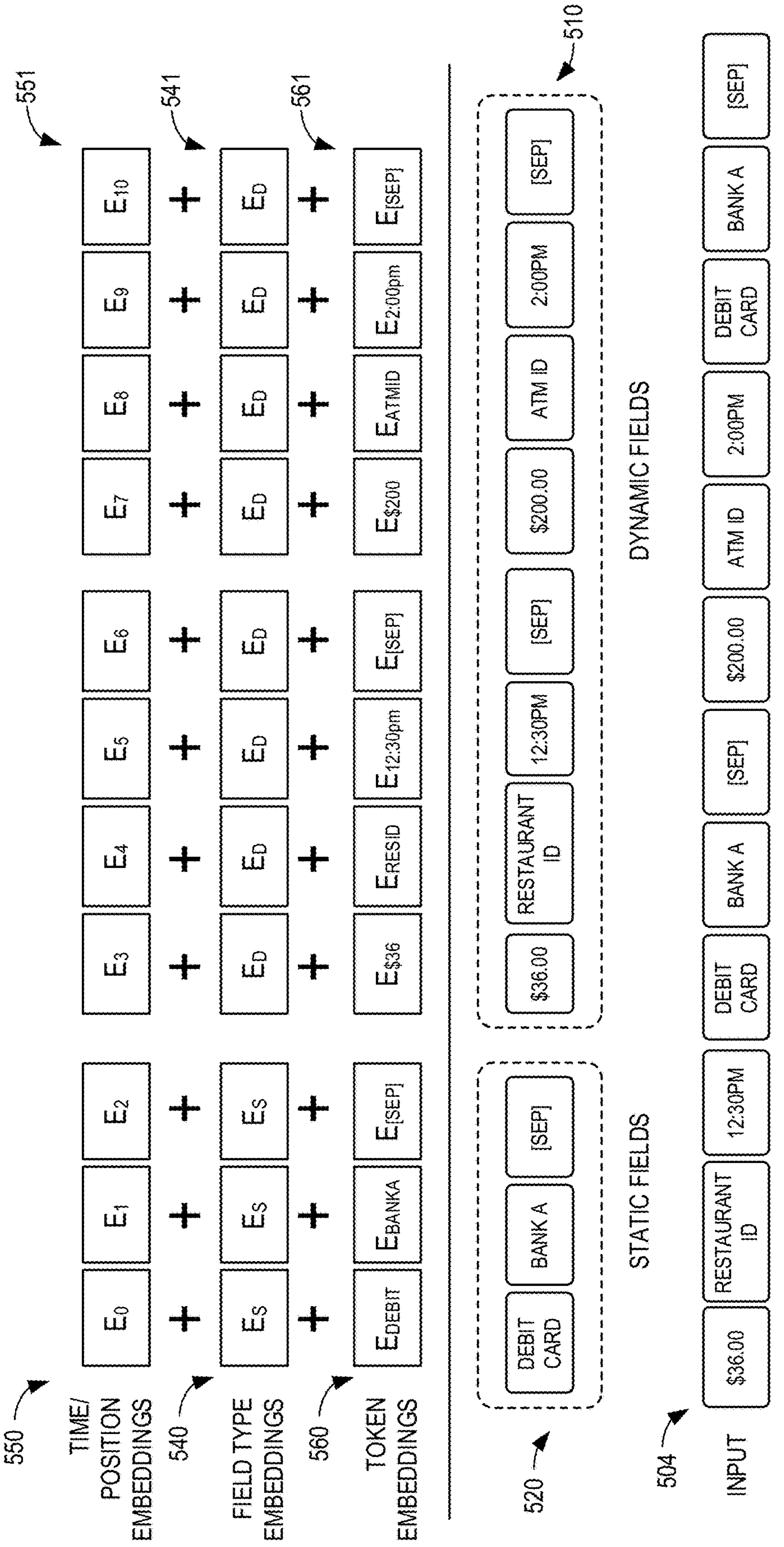
FIG. 5B is a schematic diagram of an example sequential dataset and example embeddings, according to some non-limiting embodiments or aspects.

For the purpose of illustration, referring now to FIG. 5B and with continued reference to FIG. 2, FIG. 5B shows a schematic diagram of an example sequential dataset and example embeddings, according to some non-limiting embodiments or aspects. As shown in FIG. 5B, sequential dataset 504 may include data associated with two interactions (e.g., transaction data associated with two payment transactions).

In some non-limiting embodiments or aspects, sequential dataset 504 may be tokenized (e.g., split, separated, parsed, and/or the like) into tokens (e.g., smaller items of data to be used as input to one or more machine learning models). For example, each respective field value of interaction data (e.g., each field value of transaction data associated with a payment transaction) may be represented as a respective token. As used herein, the term "token" in the context of data items to be input into a machine learning models is not to be confused with "payment token," as described herein. For example, a payment token may be a field value such that a corresponding token represents the payment token, but not all field values are payment tokens.

For the purpose of illustration, as shown in FIG. 5B, a first payment transaction may be associated with a token representing a transaction amount (e.g., $36), a token representing a restaurant identifier (e.g., Restaurant ID associated with the restaurant where the payment transaction occurred), a token representing a timestamp (12:30 PM), a token representing the type of payment device (e.g., debit card), a token representing the issuer of the payment device (e.g., Bank A), and a token indicating separation (e.g., [SEP], which may be a special purpose token indicating the end of the tokens associated with the current interaction such that the next token(s) are associated with a different interaction). A second payment transaction may be associated with a token representing a transaction amount (e.g., $200), a token representing an automated teller machine identifier (e.g., ATM ID associated with where a withdrawal occurred), a token representing a timestamp (2:00 PM), a token representing the type of payment device (e.g., debit card), a token representing the issuer of the payment device (e.g., Bank A), and a token indicating separation (e.g., [SEP]).

With continued reference to FIG. 2, in some non-limiting embodiments or aspects, transformer management system 102 may separate, for each interaction record of the plurality of interaction records, the static field data associated with the at least one static field from the dynamic field data associated with the at least one dynamic field. In some non-limiting embodiments or aspects, transformer management system 102 may generate a first input for the first transformer model based on the static field data associated with the at least one static field and/or generate a second input for the second transformer model based on the dynamic field data associated with the at least one dynamic field.

For the purpose of illustration, referring again to FIG. 5B and with continued reference to FIG. 2, sequential dataset 504 may be separated into static field data 520 associated with static fields and dynamic field data 510 associated with dynamic fields. For example, static fields may include fields that are replicated (e.g., the same, do not change between interactions, and/or the like) in every interaction (e.g., transaction) in a sequence (e.g., sequential dataset 504). As shown in FIG. 5B, static fields may be associated with the token representing the type of payment device (e.g., debit card) and the token representing the issuer of the payment device (e.g., Bank A). For example, dynamic fields may include fields that are not necessarily replicated (e.g., may not be the same, do change between at least some interactions, and/or the like) in every interaction (e.g., transaction) in a sequence (e.g., sequential dataset 504). As shown in FIG. 5B, dynamic fields may be associated with the tokens representing the transaction amount, the tokens representing certain identifiers (e.g., Restaurant ID, ATM ID, etc.), and the tokens representing the timestamps. In some non-limiting embodiments or aspects, the token indicating separation (e.g., [SEP]) may be inserted between static field data 520 and dynamic field data 510 and/or inserted between tokens associated with each interaction (e.g., transaction) of dynamic field data 510. For example, such insertion may occur before inputting the static field data 520 and dynamic field data 510 into one or more machine learning models (e.g., to indicate separation between sets of tokens).

In some non-limiting embodiments or aspects, transformer management system 102 may mask an original value of a dynamic field or a static field of a first interaction record of a sequence of interaction records to provide a masked dynamic field of the first interaction record prior to inputting static field data associated with at least one static field of the sequence of interaction records to a first transformer model or prior to inputting dynamic field data associated with at least one of dynamic field of the sequence of interaction records to a second transformer model. For example, such masking may be used for at least a portion of training (e.g., pre-training), as described herein. For the purpose of illustration, in some non-limiting embodiments or aspects, masking may be as described herein (e.g., with reference to FIG. 7A).

With continued reference to FIG. 2, at step 204, method 200 may include generating static and dynamic interaction embedding representations. For example, transformer management system 102 may generate static and dynamic interaction embedding representations. In some non-limiting embodiments or aspects, transformer management system 102 may generate a static interaction embedding representation based on inputting static field data associated with the at least one static field to a first transformer model. In some non-limiting embodiments or aspects, transformer management system 102 may generate a plurality of dynamic interaction embedding representations based on inputting dynamic field data associated with the at least one dynamic field of a sequence of interaction records to a second transformer model. The sequence of interaction records may include at least a subset of the plurality of interaction records.

For the purpose of illustration, referring again to FIG. 5B and with continued reference to FIG. 2, static interaction embedding representation 560 may be generated based on static field data 520. For example, static interaction embedding representation 560 may include an embedding for each token of static interaction embedding representation 560 (e.g., a debit embedding $E_{Debit}$ associated with the token representing the type of payment device (e.g., debit card) and an issuer embedding $E_{BankA}$ associated with the token representing the issuer of the payment device (e.g., Bank A)). In some non-limiting embodiments or aspects, a separation embedding $E_{[SEP]}$ may be associated with the token indicating separation (e.g., [SEP]).

For example, dynamic interaction embedding representations 561 may be generated based on dynamic field data 510 of the sequence of interactions (e.g., transactions). For example, dynamic interaction embedding representations 561 may include an embedding for each token of dynamic field data 510. For example, dynamic interaction embedding representations 561 may include a transaction amount embedding (e.g., $E_{\$36}$, $E_{\$200}$, etc.) associated with each token representing the transaction amount, an identifier embedding (e.g., $E_{ResID}$, $E_{ATMID}$, etc.) associated with each token representing an identifier (e.g., Restaurant ID, ATM ID, etc.), and a timestamp embedding ($E_{12:30PM}$, $E_{2:00PM}$, etc.) associated with each token representing a timestamp.

Figure 7A:
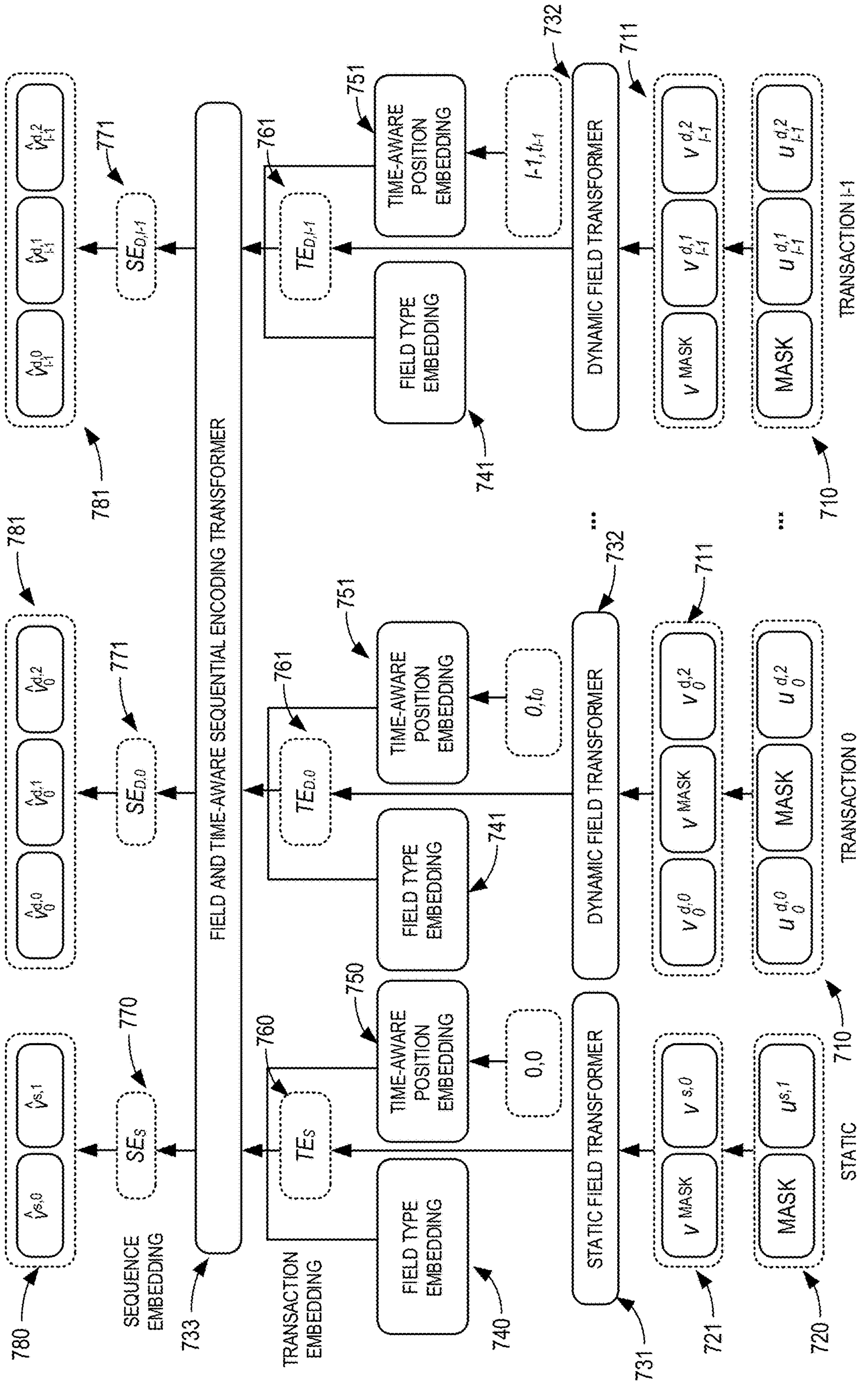
FIGS. 7A and 7B are schematic diagrams of an example implementation of a transformer machine learning model that is data type aware for sequential datasets, according to some non-limiting embodiments or aspects.
Figure 7B:
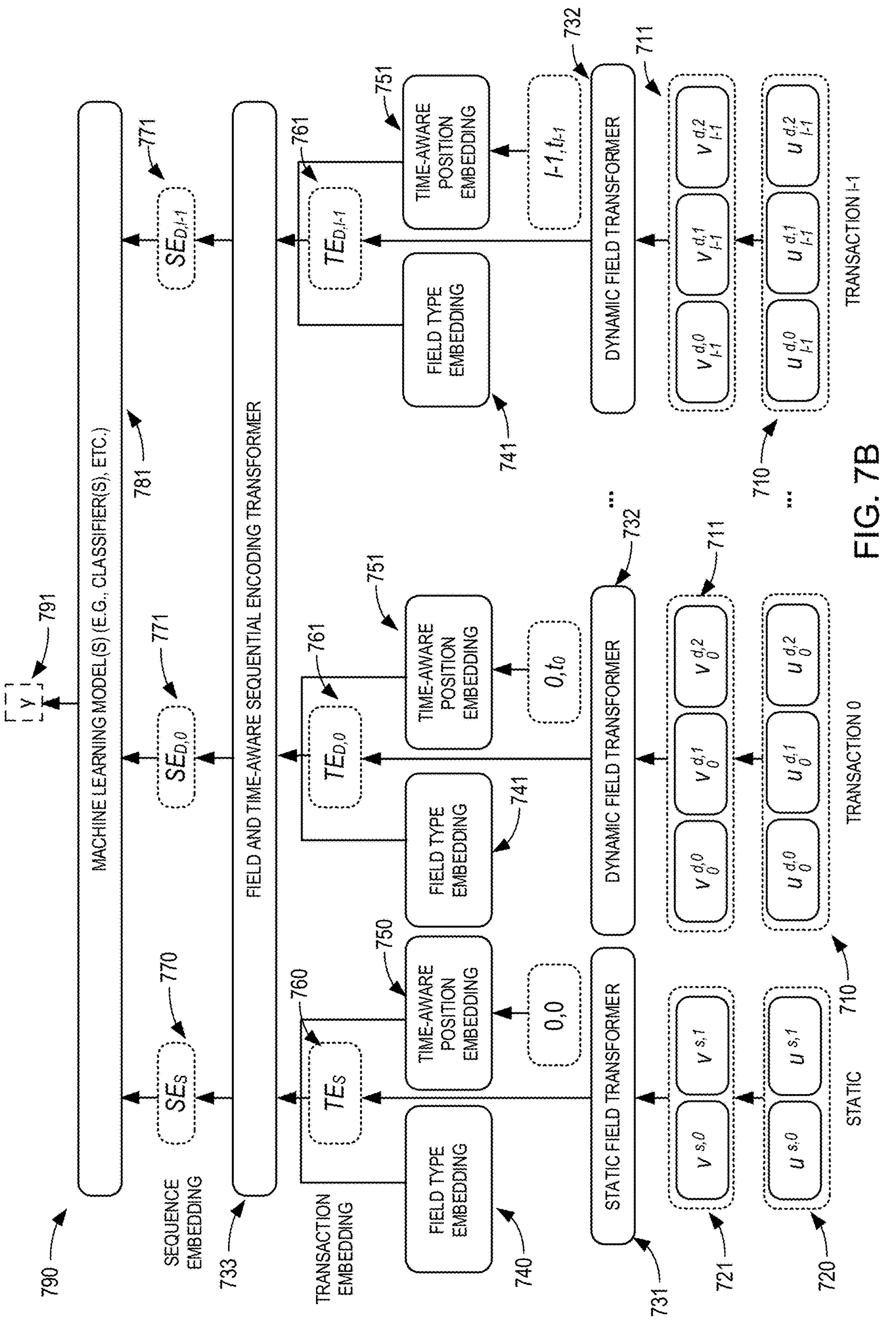

For the purpose of illustration, referring now to FIGS. 7A and 7B and with continued reference to FIG. 2, FIGS. 7A and 7B show schematic diagrams of an example implementation of a transformer machine learning model that is data type aware for sequential datasets, according to some non-limiting embodiments or aspects. As shown in FIGS. 7A and 7B, static field data 720 and dynamic field data 710 may be provided (e.g., received, retrieved, and/or the like) as input. In some non-limiting embodiments or aspects, the tokens (e.g., raw data tokens u) of static field data 720 and dynamic field data 710 may be converted to a local vocabulary (e.g., vocabulary tokens v) to generate static field vocabulary data 721 and dynamic field vocabulary data 711, e.g., before being input into one or more machine learning models (e.g., transformer models).

In some non-limiting embodiments or aspects, the raw data tokens u may be converted to vocabulary tokens v based on the following equations:

$$v_i^{d,j} = ConvertToVocab\left(u_i^{d,j}\right), \text{ for } i \in [0, l-1], j \in [0, n_d - 1] \quad \text{Equation 1}$$

$$v^{s,j} = ConvertToVocab\left(u^{s,j}\right), \text{ for } j \in [0, n_s - 1] \quad \text{Equation 2}$$

where $u^{s,j}$ are static fields, $$u_i^{d,j}$$

are dynamic fields, ConvertToVocab is the function to convert a raw token to a vocabulary token, $v^{s,j}$ are static vocabulary tokens, $$v_i^{d,j}$$

are dynamic vocabulary tokens, l is the number of interactions (e.g., transactions) in the sequences (e.g., the length of the sequence), $n_d$ is the number of dynamic fields (e.g., per interaction), and $n_s$ is the number of static fields.

In some non-limiting embodiments or aspects, the raw data tokens u may be converted to vocabulary tokens v based on a pre-processing procedure, such as the pre-processing procedure described in Padhi et al., *Tabular transformers for modeling multivariate time series*, ICASSP 2021-2021 IEEE International Conference on Acoustics, Speech and Signal Processing (ICASSP) 3565-3569 (2021), the disclosure of which is hereby incorporated by reference in its entirety.

In some non-limiting embodiments or aspects, static field vocabulary data 721 may be input to a first transformer model (e.g., static field transformer 731) to generate static interaction embedding representation 760. Additionally or alternatively, dynamic field vocabulary data 711 may be input to a second transformer model (e.g., dynamic field transformer 732) to generate dynamic interaction embedding representations 761 for each interaction (e.g., each payment transaction).

With continued reference to FIG. 2, in some non-limiting embodiments or aspects, when generating the plurality of dynamic interaction embedding representations, transformer management system 102 may generate a first dynamic interaction embedding associated with a first interaction record based on inputting first dynamic field data associated with the at least one dynamic field of the first interaction record of the sequence of interaction records to the second transformer model and generate a second dynamic interaction embedding associated with a second interaction record based on inputting second dynamic field data associated with the at least one second dynamic field of a first interaction record of the sequence of interaction records to the second transformer model.

For the purpose of illustration, referring again to FIGS. 7A and 7B and with continued reference to FIG. 2, first dynamic interaction embedding $TE_{D,0}$ may be generated based on a first interaction (e.g., Transaction 0). This may be repeated for each interaction (e.g., each transaction). For example, assuming I total transactions, a respective first dynamic interaction embedding $TE_{D,i}$ may be generated for each respective interaction (e.g., Transaction i) for all i=0, . . . , I-1.

With continued reference to FIG. 2, in some non-limiting embodiments or aspects, when generating a static interaction embedding representation based on inputting the static field data associated with at least one static field of the sequence of interaction records to the first transformer model, transformer management system 102 may generate the static interaction embedding representation based on inputting at least one masked static field of an interaction record to the first transformer model.

For the purpose of illustration, referring again to FIG. 7A and with continued reference to FIG. 2, a token of static field data 720 may be masked, and as such, a corresponding vocabulary token of static field vocabulary data 721 may be masked. As such, the static interaction embedding representation 760 (e.g., TEs) may be based on the masked token.

With continued reference to FIG. 2, in some non-limiting embodiments or aspects, when generating a plurality of dynamic interaction embedding representations based on inputting the dynamic field data associated with the plurality of dynamic fields of the sequence of interaction records to the second transformer model, transformer management system 102 may generate the plurality of dynamic interaction embedding representations based on inputting at least one masked dynamic field of an interaction record to the second transformer model.

For the purpose of illustration, referring again to FIG. 7A and with continued reference to FIG. 2, a token of dynamic field data 710 for each interaction may be masked, and as such, a corresponding vocabulary token of dynamic field vocabulary data 711 may be masked. As such, the dynamic interaction embedding representations 761 (e.g., $TE_{D,0}, \ldots, TE_{D,I-1}$) may be based on the masked token.

In some non-limiting embodiments or aspects, the tokens may be masked based on the following equations:

$$\tilde{v}_i^{d,j}, \mathbb{I}_i^{d,j} = RandomMask\left(v_i^{d,j}\right), \text{ for } i \in [0, l-1],\ j \in [0, n_d - 1] \quad \text{Equation 3}$$

$$\tilde{v}^{s,j}, \mathbb{I}^{s,j} = RandomMask\left(v^{s,j}\right), \text{ for } j \in [0, n_s - 1] \quad \text{Equation 4}$$

where $\mathbb{I}$ indicates whether a token is masked or not (e.g., if $\mathbb{I}=0$, the token is replaced by [MASK]), RandomMask is the function for randomly masking tokens, and $$\tilde{v}_i^{d,j}$$

and $\tilde{v}^{s,j}$ are the dynamic vocabulary tokens and static vocabulary tokens, respectively, after masking.

In some non-limiting embodiments or aspects, the static interaction embedding representation (e.g., static transaction embedding TEs) and dynamic interaction embedding representations (e.g., dynamic transaction embedding $TE_{D,i}$) may be generated based on the following equations:

$$TE_S = f_{\theta_{sf}}\left(\left[\tilde{v}^{s,0}, \tilde{v}^{s,1}, \ldots, \tilde{v}^{s,n_s-1}\right]\right) \quad \text{Equation 5}$$

$$TE_{D,i} = f_{\theta_{df}}\left(\left[\tilde{v}_i^{d,0}, \tilde{v}_i^{d,1}, \ldots, \tilde{v}_i^{d,n_d-1}\right]\right), \text{ for } i \in [0, l-1] \quad \text{Equation 6}$$

where $f_{\theta_{sf}}$ is the static field transformer and fear is the dynamic field transformer.

As shown in FIG. 2, at step 206, method 200 may include generating intermediate inputs. For example, transformer management system 102 may generate intermediate inputs. In some non-limiting embodiments or aspects, transformer management system 102 may generate a first intermediate input based on the static interaction embedding representation, a first time-based embedding representation, and a first field-type embedding representation associated with the at least one static field. In some non-limiting embodiments or aspects, transformer management system 102 may generate a plurality of second intermediate inputs based on each dynamic interaction embedding representation, a respective time-based embedding representation, and a second field-type embedding representation associated with the at least one dynamic field.

In some non-limiting embodiments or aspects, when generating the first intermediate input, transformer management system 102 may combine (e.g., sum, concatenate, etc.) the static interaction embedding representation, the first time-based embedding representation, and the first field-type embedding representation associated with the at least one static field.

In some non-limiting embodiments or aspects, transformer management system 102 may generate a first time-based embedding representation associated with a first interaction record and generate a second time-based embedding representation associated with a second interaction record. In some non-limiting embodiments or aspects, when generating the plurality of second intermediate inputs, transformer management system 102 may combine the first dynamic interaction embedding, the first time-based embedding representation, and the second field-type embedding representation associated with the at least one dynamic field and/or may combine the second dynamic interaction embedding, the second time-based embedding representation, and the second field-type embedding representation associated with the at least one dynamic field.

For the purpose of illustration, referring again to FIG. 5B and with continued reference to FIG. 2, static interaction embedding representation 560 may be combined with at least one static field-type embedding 540 (e.g., $E_S$) and/or at least one static time-based embedding representation 550 (e.g., $E_0$, $E_1$, and/or $E_2$).

Additionally or alternatively, each dynamic interaction embedding representation 561 may be combined with at least one dynamic field-type embedding 541 (e.g., $E_D$) and/or at least one dynamic time-based embedding representation 551 (e.g., $E_3$, $E_4$, $E_5$, and/or $E_6$ for a first transaction; $E_7$, $E_8$, $E_9$, and/or $E_{10}$ for a second interaction; etc.).

For the purpose of illustration, referring again to FIGS. 7A-7B and with continued reference to FIG. 2, static interaction embedding representation 760 (e.g., TEs) may be combined with a static field-type embedding 740 and a time-based embedding representation (e.g., time-aware position embedding 750, which may be based on position 0 and time 0).

Additionally or alternatively, each dynamic interaction embedding representation 761 (e.g., $T_{ED,0}, \ldots, TE_{D,I-1}$) may be combined with a dynamic field-type embedding 741 and a time-based embedding representation (e.g., time-aware position embedding 751, which may be based on position i and time $t_i$ associated with the i-th transaction for i=0, . . . , I-1).

In some non-limiting embodiments or aspects, the time-aware position embedding P(i) may be defined as a vector of length d, where each element p(i,j) of the vector may be determined based on the following equations:

$$TPos(i) = w_p * i + w_t * t_i + b \quad \text{Equation 7}$$

$$p(i, j) = \begin{cases} \sin\dfrac{TPos(i)}{10000\left(\frac{2j}{d}\right)} & \text{if } j \text{ is even} \\ \cos\dfrac{TPos(i)}{10000\left(\frac{2j}{d}\right)} & \text{if } j \text{ is odd} \end{cases} \quad \text{Equation 8}$$

where TPos(i) is a function used to merge information from position index i and time interval $t_i$ (e.g., which helps to capture time-aware position information through trainable parameters $w_p$, $w_t$, and b, for example, to enable learning a more flexible function).

In some non-limiting embodiments or aspects, the intermediate inputs (e.g., static intermediate input representation $IE_S$ and dynamic intermediate input representation $IE_{D,i}$) may be determined based on the following equations:

$$IE_S = TE_S + P(0) + FE_S \quad \text{Equation 9}$$

$$IE_{D,i} = TE_{D,i} + P(i) + FE_D \quad \text{Equation 10}$$

where $FE_S$ is the static field-type embedding and FED is the dynamic field-type embedding.

With continued reference to FIG. 2, at step 208, method 200 may include generating static and dynamic sequence embedding representations. For example, transformer management system 102 may generate static and dynamic sequence embedding representations. In some non-limiting embodiments or aspects, transformer management system 102 may generate a static sequence embedding representation based on inputting the first intermediate input to the third transformer model. In some non-limiting embodiments or aspects, transformer management system 102 may generate a plurality of dynamic sequence embedding representations based on inputting the plurality of second intermediate inputs to the third transformer model.

For the purpose of illustration, referring again to FIGS. 7A and 7B and with continued reference to FIG. 2, static sequence embedding representation 770 (e.g., SEs) may be generated by inputting a first intermediate input (e.g., based on combining static interaction embedding representation 760 with field-type embedding 740 and time-aware position embedding 750) to a third transformer model (e.g., first and time-aware sequential encoding transformer 733).

Additionally or alternatively, dynamic sequence embedding representations 771 (e.g., $SE_{D,0}, \ldots, SE_{D,I-1}$) may be generated by inputting second intermediate inputs (e.g., based on combining each dynamic interaction embedding representation 761 (e.g., $TE_{D,0}, \ldots, TE_{D,I-1}$) with dynamic field-type embedding 741 and a respective time-aware position embedding 751) to the third transformer model (e.g., field and time-aware sequential encoding transformer 733).

In some non-limiting embodiments or aspects, transformer management system 102 may train at least one of the transformer models (e.g., the first transformer model, the second transformer model, the third transformer model, and/or any combination thereof) by comparing a data value of a data field of at least one of a static sequence embedding representation, a dynamic sequence embedding representation (e.g., associated with an interaction record), or any combination thereof provided by the third transformer with an original value of a static or dynamic field (e.g., of the interaction record) and/or adjusting at least one parameter of the transformer model(s) based on the comparison.

In some non-limiting embodiments or aspects, the sequence embedding representations may be determined based on the following equation:

Equation 11

$$[SE_S, SE_{D,0}, SE_{D,1}, \ldots, SE_{D,l-1}] = f_{\theta_{fata}}([IE_S, IE_{D,0}, IE_{D,1}, \ldots, IE_{D,l-1}])$$

where $f_{\theta_{fata}}$ is the field and time-aware sequential encoding transformer.

For the purpose of illustration, referring again to FIG. 7A and with continued reference to FIG. 2, at least one token of at least one of static field data 720 and/or dynamic field data 710 may be masked, as described herein. Training may include inputting static field data 720 and/or dynamic field data 710 (e.g., including the masked token(s)) to the transformer model(s), as described herein, and the inputs may be forward propagated through the transformer model(s) to generate static sequence embedding representation 770 and/or dynamic sequence embedding representations 771, as described herein. A predicted value for each masked token may be generated based on the sequence embeddings (e.g., static sequence embedding representation 770 and dynamic sequence embedding representations 771). For example, the sequence embeddings may be inputted to a classifier model (e.g., $f_{\theta_{class}}$) to generate the predicted values (e.g., $Pr_{\theta_{class}}(v)$). In some non-limiting embodiments or aspects, the predicted values may be generated based on the following equation:

Equation 12

$$\begin{aligned}&\Big[Pr_{\theta_{class}}\big(v^{s,0}\big), Pr_{\theta_{class}}\big(v^{s,1}\big), \ldots, Pr_{\theta_{class}}\big(v^{s,n_s-1}\big),\\ &Pr_{\theta_{class}}\big(v_0^{d,0}\big), Pr_{\theta_{class}}\big(v_0^{d,1}\big), \ldots, Pr_{\theta_{class}}\big(v_0^{d,n_d-1}\big),\\ &Pr_{\theta_{class}}\big(v_1^{d,0}\big), Pr_{\theta_{class}}\big(v_1^{d,1}\big), \ldots, Pr_{\theta_{class}}\big(v_{l-1}^{d,n_d-1}\big)\Big] =\\ &f_{\theta_{class}}([SE_S, SE_{D,0}, SE_{D,1}, \ldots, SE_{D,l-1}])\end{aligned}$$

For the purpose of illustration, as shown in FIG. 7A, $\overline{v}^{s,0}$ may be predicted and may correspond to the mistaken token (e.g., MASK) of static field data 720;

$$\hat{v}_0^{d,1}$$

may be predicted and may correspond to the masked token (e.g., MASK) of dynamic field data 710 for Transaction 0; and $$\hat{v}_{l-1}^{d,1}$$

may be predicted and may correspond to the masked token (e.g., MASK) of dynamic field data 710 for Transaction I-1. The predicted value(s) may be compared to a respective original value (e.g., the actual value u of static field data 720 and/or dynamic field data 710 before being masked or the vocabulary v of such actual value). For example, a loss may be determined based on the predicted value(s) and the corresponding original value(s) (or vocabulary thereof). For example, the losses may be calculated based on a difference between the predicted and original values, a loss function, a cross-entropy loss, an error, a mean error, a mean squared error (MSE), any combination thereof, and/or the like. In some non-limiting embodiments or aspects, the loss $\ell$ (e.g., cross-entropy loss) may be calculated based on the following equation:

Equation 13

$$\ell = -\sum_{j=0}^{n_s-1} \left(1 - \mathbb{I}^{s,j}\right) \log Pr_{\theta_{class}}\left(v^{s,j}\right) - \sum_{l=0}^{l-1} \sum_{j=0}^{n_d-1} \left(1 - \mathbb{I}_i^{d,j}\right) \log Pr_{\theta_{class}}\left(v_i^{d,j}\right)$$

The parameters of at least one of the transformers (e.g., at least one of static field transformer 731, dynamic field transformer 732, field and time-aware sequential encoding transformer 733, any combination thereof, and/or the like) may be updated based on the loss. For example, transformer management system 102 may update (e.g., adjust) the parameters of the transformer(s) based on back propagation (e.g., of the loss(es)), gradient calculations (e.g., based on the loss(es)), any combination thereof, and/or the like.

In some non-limiting embodiments or aspects, pretraining the model to predict a masked value may be referred to as pretraining.

With continued reference to FIG. 2, at step 210, method 200 may include generating prediction based on static and dynamic sequence embedding representations. For example, transformer management system 102 may generate prediction based on static and dynamic sequence embedding representations. In some non-limiting embodiments or aspects, transformer management system 102 may generate at least one prediction based on inputting the static sequence embedding representation and the plurality of dynamic sequence embedding representations to a machine learning model. In some non-limiting embodiments or aspects, transformer management system 102 may perform an action (e.g., a fraud detection action, a visualization action, etc.) based on the prediction. For example, transformer management system 102 may perform an action associated with a fraud detection task based on the at least one prediction.

Figure 6:
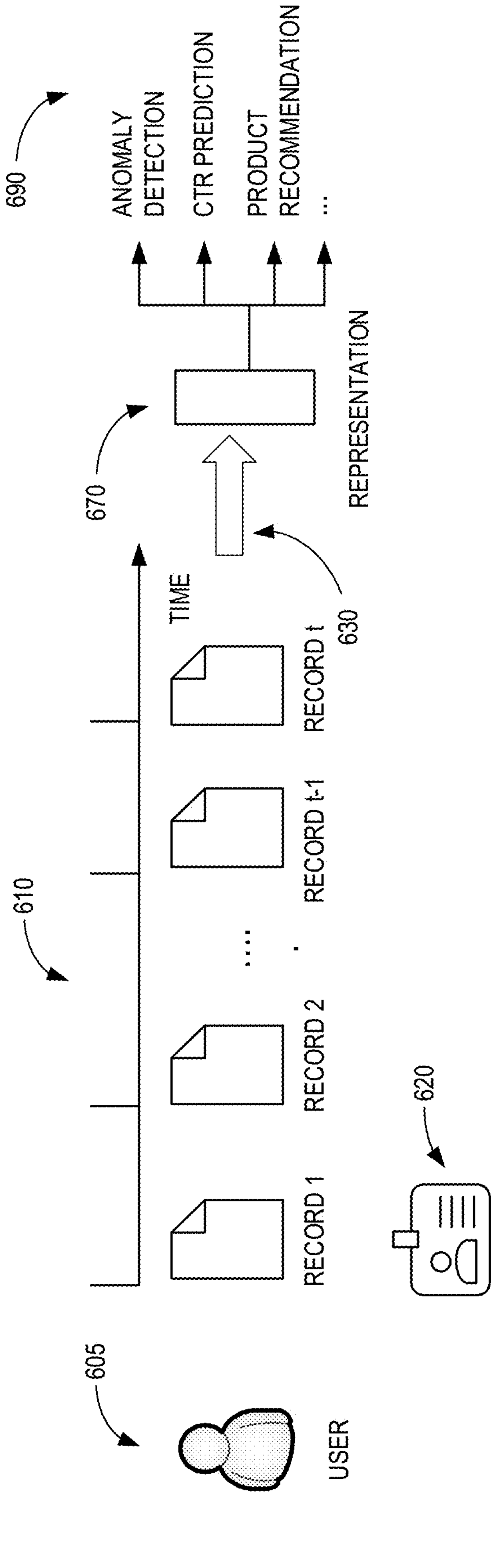
FIG. 6 is a schematic diagram of an example implementation of systems and methods for a transformer machine learning model that is data type aware for sequential datasets, according to some non-limiting embodiments or aspects.

For the purpose of illustration, referring now to FIG. 6 and with continued reference to FIG. 2, FIG. 6 shows a schematic diagram of an example implementation of systems and methods for a transformer machine learning model that is data type aware for sequential datasets, according to some non-limiting embodiments or aspects. As shown in FIG. 6, static field data 620 and dynamic field data 610 may be associated with user 605 (e.g., may be associated with at least one account identifier of user 605). For example, static field data 620 may be associated with static fields and dynamic field data 610 may be associated with dynamic fields of a sequential dataset including t records (e.g., record 1, record 2, . . . , record t), as described herein.

The static field data 620 and dynamic field data 610 may be input to machine learning model 630, which may include at least one transformer model, such as a first transformer model (e.g., static field transformer model), a second transformer model (e.g., a dynamic field transformer model), a third transformer model (e.g., a field and time-aware sequential encoding transformer model), any combination thereof, and/or the like. In some non-limiting embodiments or aspects, machine learning model 630 may have been trained (e.g., pretrained), as described herein.

In some non-limiting embodiments or aspects, machine learning model 630 may generate representation 670 (e.g., a sequence representation based on a static sequence embedding representation and dynamic sequence embedding representations associated with each record). For example, representation 670 may be inputted to at least one other machine learning model 690 (e.g., a downstream machine learning model) to perform at least one task. For the purpose of illustration, as shown in FIG. 6, the other machine learning model(s) 690 may include one of an anomaly detection model to perform an anomaly detection task (e.g., classify the sequence as abnormal or not abnormal), a CTR prediction model to predict CTR, a product recommendation model to predict at least one recommended product, a fraud detection model to perform a fraud detection model (e.g., classify the sequence as fraudulent or not fraudulent), an authorization model to perform an authorization task, an authentication model to perform an authentication task, an identification to perform an identification task, a feature selection model to perform a feature selection task, any combination thereof, and/or the like.

For the purpose of illustration, referring again to FIG. 7B and with continued reference to FIG. 2, in some non-limiting embodiments or aspects, masking is no longer used after pretraining. As such, static field data 720 and dynamic field data 710 do not include masked tokens (e.g., all tokens have their original values).

In some non-limiting embodiments or aspects, the sequence embeddings (e.g., static sequence embedding representation 770 and/or dynamic sequence embedding representations 771) may be input to at least one machine learning model 790 (e.g., at least one classifier and/or the like, as described herein). Machine learning model(s) 790 may generate at least one output 791 (e.g., a prediction, a classification, and/or the like, as described herein) based on the sequence embeddings.

In some non-limiting embodiments or aspects, at least one of the transformer(s) (e.g., static field transformer 731, dynamic field transformer 732, and/or field and time-aware sequential encoding transformer 733) may be (re) trained and/or machine learning model(s) 790 may be trained. For example, static field data 720 and/or dynamic field data 710 may be inputted to the transformer model(s), as described herein, and the inputs may be forward propagated through the transformer model(s) to generate static sequence embedding representation 770 and/or dynamic sequence embedding representations 771, as described herein. Machine learning model(s) 790 may generate output(s) 791 based on the sequence embeddings (e.g., generate static sequence embedding representation 770 and/or dynamic sequence embedding representations 771), as described herein. A loss may be determined based on the predicted value(s). For example, the loss may be determined based on the output(s) 791 and known value(s) (e.g., labels), a loss function, an error, a mean error, an MSE, any combination thereof, and/or the like. The parameters of at least one of the transformers (e.g., at least one of static field transformer 731, dynamic field transformer 732, field and time-aware sequential encoding transformer 733, any combination thereof, and/or the like) and/or machine learning model(s) 790 may be updated based on the loss. For example, transformer management system 102 may update (e.g., adjust) the parameters of the transformer(s) and/or machine learning model(s) 790 based on back propagation (e.g., of the loss(es)), gradient calculations (e.g., based on the loss(es)), any combination thereof, and/or the like.

In some non-limiting embodiments or aspects, this (re) training based on the output(s) 791 of machine learning model(s) 790 may be referred to as finetuning.

In some non-limiting embodiments or aspects, method 200 may be implemented according to the following algorithm:

Algorithm 1

Input: X - transaction sequence dataset
$x: [x_0, x_1, \ldots, x_{l-1}], x \in X$ - transaction sequence sample.

Figure 3:
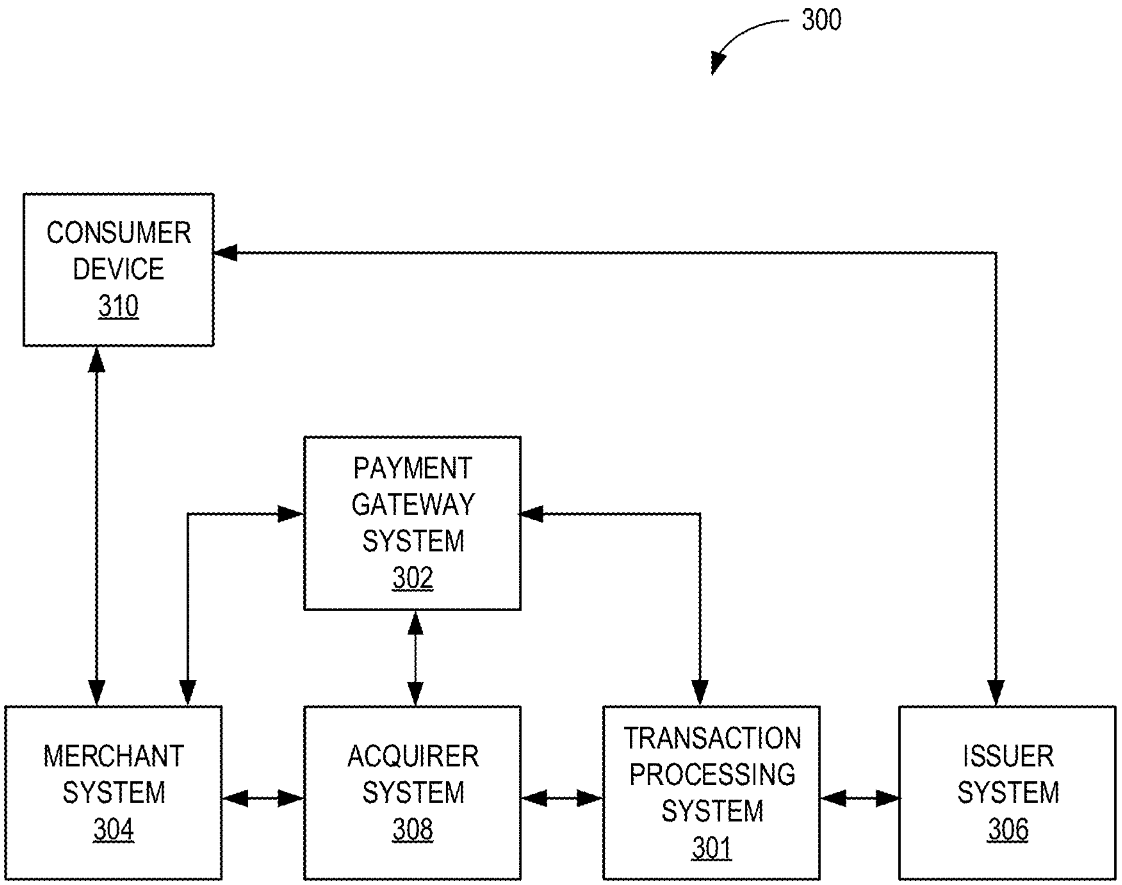
FIG. 3 is a schematic diagram of an example payment processing network in which methods, systems, and/or computer program products, described herein, may be implemented, according to some non-limiting embodiments or aspects.

$x_i: \left\{u^{s,0}, u^{s,1}, \ldots, u^{s,n_s-1}, u_i^{d,0}, u_i^{d,1}, \ldots, u_i^{d,n_d-1}\right\}$ - transaction sample, composed of $n_s$ static fields and $n_d$ dynamic fields.
$t: [t_0, t_1, \ldots, t_{l-1}]$ - transaction creation time sequence.
Parameter: $\theta_{sf}$ - Static Filed Transformer's parameter
$\theta_{df}$ - Dynamic Field Transformer's parameter
$\theta_{sec}$ - Field and Time-Aware Sequential Encoding Transformer
$\theta_{cls}$ - Classifier
Output: $Pr_{\theta_{cls}}(v)$ - predicted probability for a field u's corresponding vocabulary v while $\theta_{sf}, \theta_{df}, \theta_{sec}, \theta_{cls}$ not converged do
  sample x from X
  for $i \in [0, l-1]$ do
    for $j \in [0, n_d-1]$ do
      $v_i^{d,j} = \text{ConvertToVocab}\left(u_i^{d,j}\right)$
      $v_i^{-d,j}, \mathbb{M}_i^{d,j} = \text{RandomMask}\left(v_i^{d,j}\right)$
    end for
  end for
  for $j \in [0, n_s-1]$ do
    $v^{s,j} = \text{ConvertToVocab}(u^{s,j})$
    $v^{-s,j}, \mathbb{M}^{s,j} = \text{RandomMask}(v^{s,j})$
  end for
  $TE_s = f_{\theta_{sf}}([v^{-s,0}, v^{-s,1}, \ldots v^{-s,n_s-1}])$
  for $i \in [0, l-1]$ do
    $TE_{D,i} = f_{\theta_{df}}\left(\left[v_i^{-d,0}, v_i^{-d,1}, \ldots, v_i^{-d,n_d-1}\right]\right)$
  end for
  $[SE_S, SE_{D,D}, SE_{D,1}, \ldots SE_{D,l-1}] = f_{\theta_{sec}}([TE_S, TE_{D,D}, TE_{D,1}, \ldots TE_{D,l-1}]. [0, t_0, t_1, t_2, \ldots t_{l-1}], [0, 0, 1, 2, \ldots l-1])$
  $[Pr_{\theta_{cls}}(v^{s,0}), Pr_{\theta_{cls}}(v^{s,1}), \ldots, Pr_{\theta_{cls}}(v^{s,n_s-1}),$
  $Pr_{\theta_{cls}}\left(v_0^{d,0}\right), Pr_{\theta_{cls}}\left(v_0^{d,1}\right), \ldots, Pr_{\theta_{cls}}\left(v_0^{d,n_d-1}\right),$
  $Pr_{\theta_{cls}}\left(v_1^{d,0}\right), Pr_{\theta_{cls}}\left(v_1^{d,1}\right), \ldots, Pr_{\theta_{cls}}\left(v_{1-l}^{d,n_d-1}\right),] =$
  $f_{\theta_{sec}}([SE_S, SE_{D,D}, SE_{D,1}, \ldots SE_{D,l-1}])$
  $l_{static} = -\Sigma \log Pr_{\theta_{cls}}(v^{s,j})$ for $v^{s,j} \in x_i$ & $\mathbb{M}^{s,j} = 1$
  $l_{dynamic} = -\sum_{i=0}^{l-1} \sum Pr_{\theta_{cls}}\left(v_i^{d,j}\right)$ for $v_i^{d,j} \in x_i$ & $\mathbb{M}_i^{d,j} = 1$
  $l = l_{static} + l_{dynamic}$
  $\theta_{sf}, \theta_{df}, \theta_{sec}, \theta_{cls} = \text{BackPropagation}(l, \theta_{sf}, \theta_{df}, \theta_{sec}, \theta_{cls})$
end while Referring now to FIG. 3, depicted is a diagram of an example payment processing network 300, according to non-limiting embodiments or aspects. In some non-limiting embodiments or aspects, payment processing network 300 may be used in conjunction with the systems, methods, and/or computer program products described herein, and/or the systems, methods, and/or computer program products described herein may be implemented in payment processing network 300. As shown in FIG. 3, payment processing network 300 may include transaction processing system 301, payment gateway system 302, merchant system 304, issuer system 306, acquirer system 308, and/or consumer device 310. In some non-limiting embodiments or aspects, each of transformer management system 102, transaction service provider system 104, and/or user device 106 of FIG. 1 may be implemented by (e.g., part of) transaction processing system 301. For example, transaction service provider system 104 may be the same as or similar to transaction processing system 301. In some non-limiting embodiments or aspects, at least one of transformer management system 102 and/or user device 106 of FIG. 1 may be implemented by (e.g., part of) another system, another device, another group of systems, or another group of devices, separate from or including transaction processing system 301, such as merchant system 304, issuer system 306, acquirer system 308, consumer device 310, and/or the like. For example, user device 106 may be implemented by (e.g., part of) at least one of payment gateway system 302, merchant system 304, issuer system 306, acquirer system 308, and/or consumer device 310. Additionally or alternatively, for example, transformer management system 102 may be implemented by (e.g., part of) at least one of payment gateway system 302, merchant system 304, issuer system 306, acquirer system 308, and/or consumer device 310.

Transaction processing system 301 may include one or more devices capable of receiving information from and/or communicating information to payment gateway system 302, merchant system 304, issuer system 306, acquirer system 308, consumer device 310, and/or the like (e.g., directly, indirectly, via a public and/or private communication network connection, and/or the like). For example, as shown in FIG. 3, transaction processing system 301 may be in communication with one or more issuer systems (e.g., issuer system 306), one or more acquirer systems (e.g., acquirer system 308), and/or one or more payment gateway systems (e.g., payment gateway system 302). Although only a single issuer system 306, single acquirer system 308, and single payment gateway system 302 are shown, it will be appreciated that transaction processing system 301 may be in communication with a plurality of issuer systems, a plurality of acquirer systems, and/or a plurality of payment gateways. In some non-limiting embodiments or aspects, transaction processing system 301 may include a computing device, such as a server (e.g., a transaction processing server), a group of servers, and/or other like devices. In some non-limiting embodiments or aspects, transaction processing system 301 may be in communication with a data storage device, which may be local or remote to transaction processing system 301. In some non-limiting embodiments or aspects, transaction processing system 301 may be capable of receiving information from, storing information in, communicating information to, or searching information stored in the data storage device. In some non-limiting embodiments or aspects, transaction processing system 301 may be associated with a transaction service provider, as described herein. In some non-limiting embodiments or aspects, transaction processing system 301 may also operate as an issuer system such that both transaction processing system 301 and issuer system 306 are a single system and/or controlled by a single entity.

Payment gateway system 302 may include one or more devices capable of receiving information from and/or communicating information to transaction processing system 301, merchant system 304, issuer system 306, acquirer system 308, consumer device 310, and/or the like (e.g., directly, indirectly, via a public and/or private communication network connection, and/or the like). For example, as shown in FIG. 3, payment gateway system 302 may be in communication with one or more merchant systems (e.g., merchant system 304), one or more acquirer systems (e.g., acquirer system 308), and/or one or more transaction processing systems (e.g., transaction processing system 301). Although only a single merchant system 304, single acquirer system 308, and single transaction processing system 301 are shown, it will be appreciated that payment gateway system 302 may be in communication with a plurality of merchant systems, a plurality of acquirer systems, and/or a plurality of transaction processing systems. In some non-limiting embodiments or aspects, payment gateway system 302 may include a computing device, such as a server, a group of servers, and/or other like devices. In some non-limiting embodiments or aspects, payment gateway system 302 may be associated with a payment gateway, as described herein.

Merchant system 304 may include one or more devices capable of receiving information from and/or communicating information to transaction processing system 301, payment gateway system 302, issuer system 306, acquirer system 308, consumer device 310, and/or the like (e.g., directly, indirectly, via a public and/or private communication network connection, and/or the like). For example, as shown in FIG. 3, merchant system 304 may be in communication with one or more payment gateway systems (e.g., payment gateway system 302), one or more acquirer systems (e.g., acquirer system 308), and/or one or more consumer devices (e.g., consumer device 310). Although only a single payment gateway system 302, single acquirer system 308, and single consumer device 310 are shown, it will be appreciated that merchant system 304 may be in communication with a plurality of payment gateway systems, a plurality of acquirer systems, and/or a plurality of consumer devices. In some non-limiting embodiments or aspects, merchant system 304 may include a computing device, such as a server, a group of servers, a client device, a group of client devices, a POS device, a POS system, computers, computer systems, peripheral devices, and/or other like devices. In some non-limiting embodiments or aspects, merchant system 304 may be associated with a merchant, as described herein. In some non-limiting embodiments or aspects, merchant system 304 may include a device capable of receiving information from and/or communicating information to consumer device 310 via a short range communication connection (e.g., an NFC communication connection, an RFID communication connection, a Bluetooth® communication connection, a Zigbee® communication connection, and/or the like) with consumer device 310 and/or the like. In some non-limiting embodiments or aspects, merchant system 304 may include one or more client devices. For example, merchant system 304 may include a client device that allows a merchant to communicate information to transaction processing system 301 (e.g., via at least one of acquirer system 308 and/or payment gateway system 302). In some non-limiting embodiments or aspects, merchant system 304 (e.g., a client device thereof, a POS device thereof, and/or the like) may also operate as a payment gateway system such that both merchant system 304 and payment gateway system 302 are a single system and/or controlled by a single entity.

Issuer system 306 may include one or more devices capable of receiving information and/or communicating information to transaction processing system 301, payment gateway system 302, merchant system 304, acquirer system 308, consumer device 310, and/or the like (e.g., directly, indirectly, via a public and/or private communication network connection, and/or the like). For example, as shown in FIG. 3, issuer system 306 may be in communication with one or more transaction processing systems (e.g., transaction processing system 301) and/or one or more consumer devices (e.g., consumer device 310). Although only a single transaction processing system 301 and a single consumer device 310 are shown, it will be appreciated that issuer system 306 may be in communication with a plurality of transaction processing systems and/or a plurality of consumer devices 310. In some non-limiting embodiments or aspects, issuer system 306 may include a computing device, such as a server, a group of servers, and/or other like devices. In some non-limiting embodiments or aspects, issuer system 306 may be associated with an issuer institution, as described herein. For example, issuer system 306 may be associated with an issuer institution that issued a credit account, debit account, credit card, debit card, a payment device, and/or the like to a user associated with consumer device 310.

Acquirer system 308 may include one or more devices capable of receiving information from and/or communicating information to transaction processing system 301, payment gateway system 302, merchant system 304, issuer system 306, consumer device 310, and/or the like (e.g., directly, indirectly, via a public and/or private communication network connection, and/or the like). For example, as shown in FIG. 3, acquirer system 308 may be in communication with one or more transaction processing systems (e.g., transaction processing system 301), one or more payment gateway systems (e.g., payment gateway system 302), and/or one or more merchant systems (e.g., merchant system 304). Although only a single transaction processing system 301, a single payment gateway system 302, and a single merchant system 304 are shown, it will be appreciated that acquirer system 308 may be in communication with a plurality of transaction processing systems, a plurality of payment gateway systems, and/or a plurality of merchant systems. In some non-limiting embodiments or aspects, acquirer system 308 may include a computing device, such as a server, a group of servers, and/or other like devices. In some non-limiting embodiments or aspects, acquirer system 308 may be associated with an acquirer institution, as described herein.

Consumer device 310 may include one or more devices capable of receiving information from and/or communicating information to transaction processing system 301, payment gateway system 302, merchant system 304, issuer system 306, acquirer system 308, and/or the like (e.g., directly, indirectly, via a public and/or private communication network connection, and/or the like). For example, as shown in FIG. 3, consumer device 310 may be in communication with one or more merchant systems (e.g., merchant system 304) and/or one or more issuer systems (e.g., issuer system 306). Although only a single merchant system 304 and a single issuer system 306 are shown, it will be appreciated that consumer device 310 may be in communication with a plurality of merchant systems and/or a plurality of issuer systems. In some non-limiting embodiments or aspects, consumer device 310 may be associated with a user to whom a credit account, debit account, credit card, debit card, a payment device, and/or the like has been issued. In some non-limiting embodiments or aspects, user device 310 may include a computing device, such as a computer, a portable computer, a laptop computer, a tablet computer, a mobile device, a cellular phone, a smartphone, a wearable device (e.g., watches, glasses, lenses, clothing, and/or the like), a PDA, a client device, and/or other like devices. In some non-limiting embodiments or aspects, user device 310 may include a payment device, as described herein. In some non-limiting embodiments or aspects, consumer device 310 may include a device capable of receiving information from and/or communicating information to other customer devices 310 (e.g., directly, indirectly, via a public and/or private communication network connection, a short range communication connection, and/or the like). In some non-limiting embodiments or aspects, consumer device 310 may include a device capable of receiving information from and/or communicating information to merchant system 304 via a short range communication connection (e.g., an NFC communication connection, an RFID communication connection, a Bluetooth® communication connection, a Zigbee® communication connection, and/or the like) with merchant system 304 and/or the like. In some non-limiting embodiments or aspects, consumer device 310 may include a client device.

In some non-limiting embodiments or aspects, transaction processing system 301 may communicate with merchant system 304 directly (e.g., via a public and/or private communication network connection and/or the like). Additionally or alternatively, transaction processing system 301 may communicate with merchant system 304 through payment gateway 302 and/or acquirer system 308. In some non-limiting embodiments or aspects, an acquirer system 308 associated with merchant system 304 may operate as payment gateway 302 to facilitate the communication of transaction messages (e.g., authorization requests) from merchant system 304 to transaction processing system 301. In some non-limiting embodiments or aspects, merchant system 304 may communicate with payment gateway 302 directly (e.g., via a public and/or private communication network connection and/or the like). For example, a merchant system 304 that includes a physical POS device may communicate with payment gateway 302 through a public or private network to conduct card-present transactions. As another example, a merchant system 304 that includes a server (e.g., a web server) may communicate with payment gateway 302 through a public or private network, such as the Internet, to conduct card-not-present transactions.

For the purpose of illustration, processing a transaction (e.g., a payment transaction) may include generating a transaction message (e.g., authorization request and/or the like) based on an account identifier of a customer (e.g., accountholder associated with customer device 310 and/or the like) and/or transaction data associated with the transaction. For example, merchant system 304 (e.g., a client device of merchant system 304, a POS device of merchant system 304, and/or the like) may initiate the transaction, e.g., by generating an authorization request (e.g., in response to receiving the account identifier from a payment device and/or a portable financial device of the customer and/or the like). Merchant system 304 may communicate the authorization request to payment gateway 302 and/or acquirer system 308. In some non-limiting embodiments or aspects, payment gateway 302 may communicate the authorization request to acquirer system 308 and/or transaction processing system 301. Additionally or alternatively, acquirer system 308 (and/or payment gateway 302) may communicate the authorization request to transaction processing system 301. After receiving the authorization request from merchant system 304 that identifies the account identifier of the customer (e.g., the accountholder associated with consumer device 310 and/or the account identifier), transaction processing system 301 may communicate the authorization request to issuer system 306 (e.g., the issuer system that issued the payment device and/or account identifier). Issuer system 306 may determine an authorization decision (e.g., approve, deny, and/or the like) based on the authorization request, and/or issuer system 306 may generate an authorization response based on the authorization decision and/or the authorization request. Issuer system 306 may communicate the authorization response to transaction processing system 301. Transaction processing system 301 may communicate the authorization response to acquirer system 308 and/or payment gateway 302. In some non-limiting embodiments or aspects, acquirer system 308 may communicate the authorization response to payment gateway 302 and/or merchant system 304. Additionally or alternatively, payment gateway 302 (and/or acquirer system 308) may communicate the authorization response to merchant system 304.

In some non-limiting embodiments or aspects, transaction processing system 301 and/or issuer system 306 may include at least one machine learning model (e.g., at least one of a fraud detection model, a risk detection model, a transaction authorization model, a credit approval model, a product recommendation model, a classifier model, an anomaly detection model, an authentication model, any combination thereof, and/or the like). For example, the machine learning model(s) may include at least one of the transformer(s) and/or at least one of the other machine learning model(s) described herein. For example, transaction processing system 301 and/or issuer system 306 may include transformer management system 102 and/or the like. Transaction processing system 301 and/or issuer system 306 may perform at least one task (e.g., generate a prediction and/or generate an embedding) based on the authorization request and the machine learning model(s). For example, performing the task(s) may include generating at least one prediction associated with fraud detection, risk detection, transaction authorization, credit approval, product recommendation, classification, anomaly detection, authentication, any combination thereof, and/or the like. In some non-limiting embodiments or aspects, transaction processing system 301 may communicate at least one message based on performing the task (e.g., generating the prediction and/or generate an embedding) to issuer system 306 (e.g., along with the authorization request). In some non-limiting embodiments or aspects, issuer system 306 may determine the authorization decision (e.g., approve, deny, and/or the like) based on the authorization request and the performance of the task (e.g., generation of the prediction and/or generation of the embedding).

For the purpose of illustration, clearing and/or settlement of a transaction may include generating a message (e.g., clearing message and/or the like) based on an account identifier of a customer (e.g., associated with customer device 310 and/or the like) and/or transaction data associated with the transaction. For example, merchant system 304 may generate at least one clearing message (e.g., a plurality of clearing messages, a batch of clearing messages, and/or the like). Merchant system 304 may communicate the clearing message(s) to acquirer system 308 (and/or payment gateway 302, which may communicate the clearing message(s) to acquirer system 308). Acquirer system 308 may communicate the clearing message(s) to transaction processing system 301. Transaction processing system 301 may communicate the clearing message(s) to issuer system 306. Issuer system 306 may generate at least one settlement message based on the clearing message(s). In some non-limiting embodiments or aspects, issuer system 306 may communicate the settlement message(s) and/or funds to transaction processing system 301 (and/or a settlement bank system associated with transaction processing system 301), and transaction processing system 301 (and/or the settlement bank system) may communicate the settlement message(s) and/or funds to acquirer system 308. Additionally or alternatively, issuer system 306 may communicate the settlement message(s) and/or funds to acquirer system 308. In some non-limiting embodiments or aspects, acquirer system 308 may communicate settlement message(s) and/or funds to merchant system 304 (and/or an account associated with merchant system 304).

The systems and/or devices of FIG. 3 may communicate via one or more wired and/or wireless communication networks. For example, the communication network(s) may include a cellular network (e.g., a long-term evolution (LTE®) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 3 are provided as an example. There may be additional systems, devices, and/or networks; fewer systems, devices, and/or networks; different systems, devices, and/or networks; and/or differently arranged systems, devices, and/or networks than those shown in FIG. 3. Furthermore, two or more systems or devices shown in FIG. 3 may be implemented within a single system or device, or a single system or device shown in FIG. 3 may be implemented as multiple, distributed systems or devices. Additionally or alternatively, a set of systems (e.g., one or more systems) or a set of devices (e.g., one or more devices) of payment processing network 300 may perform one or more functions described as being performed by another set of systems or another set of devices of payment processing network 300.

Figure 4:
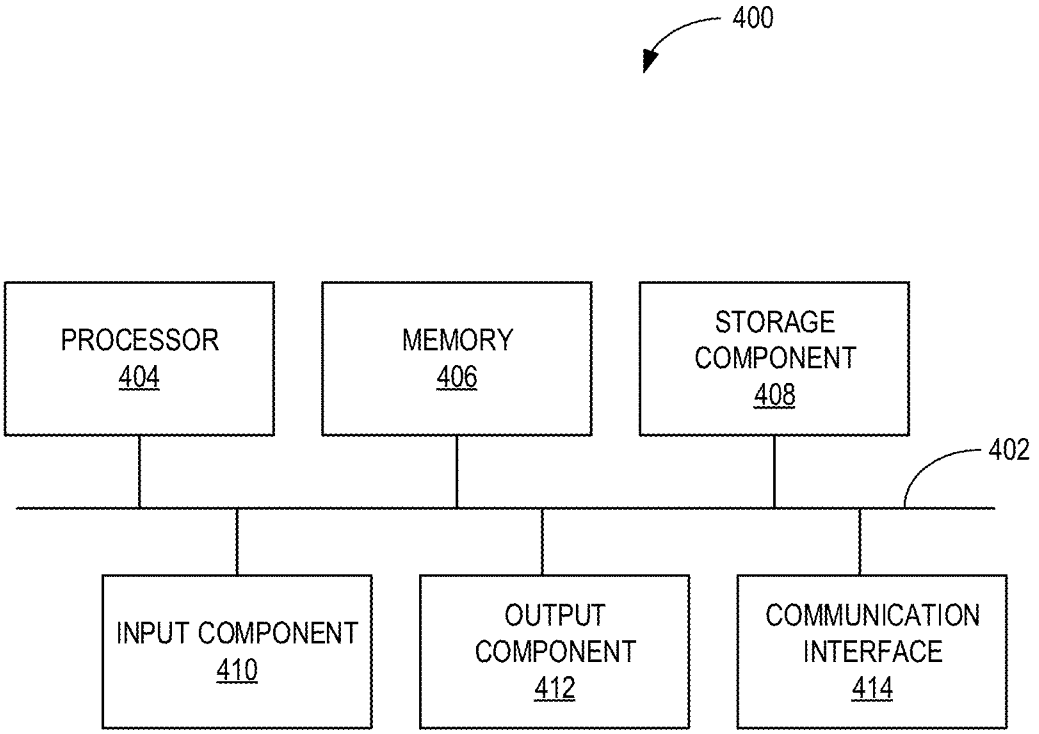
FIG. 4 is a schematic diagram of example components of one or more devices of FIG. 1 and/or FIG. 3, according to some non-limiting embodiments or aspects.

Referring now to FIG. 4, shown is a diagram of example components of a device 400 according to non-limiting embodiments. Device 400 may correspond to transformer management system 102, transaction service provider system 104, and/or user device 106 of FIG. 1 and/or transaction processing system 301, payment gateway system 302, merchant system 304, issuer system 306, acquirer system 308, and/or consumer device 310 of FIG. 3, as an example. In some non-limiting embodiments, such systems or devices may include at least one device 400 and/or at least one component of device 400. The number and arrangement of components shown are provided as an example. In some non-limiting embodiments, device 400 may include additional components, fewer components, different components, or differently arranged components than those shown. Additionally or alternatively, a set of components (e.g., one or more components) of device 400 may perform one or more functions described as being performed by another set of components of device 400.

As shown in FIG. 4, device 400 may include a bus 402, a processor 404, memory 406, a storage component 408, an input component 410, an output component 412, and a communication interface 414. Bus 402 may include a component that permits communication among the components of device 400. In some non-limiting embodiments, processor 404 may be implemented in hardware, firmware, or a combination of hardware and software. For example, processor 404 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 406 may include random access memory (RAM), read only memory (ROM), and/or another type of dynamic or static storage device (e.g., flash memory, magnetic memory, optical memory, etc.) that stores information and/or instructions for use by processor 404.

With continued reference to FIG. 4, storage component 408 may store information and/or software related to the operation and use of device 400. For example, storage component 408 may include a hard disk (e.g., a magnetic disk, an optical disk, a magneto-optic disk, a solid-state disk, etc.) and/or another type of computer-readable medium. Input component 410 may include a component that permits device 400 to receive information, such as via user input (e.g., a touch screen display, a keyboard, a keypad, a mouse, a button, a switch, a microphone, etc.). Additionally or alternatively, input component 410 may include a sensor for sensing information (e.g., a global positioning system (GPS) component, an accelerometer, a gyroscope, an actuator, etc.). Output component 412 may include a component that provides output information from device 400 (e.g., a display, a speaker, one or more light-emitting diodes (LEDs), etc.). Communication interface 414 may include a transceiver-like component (e.g., a transceiver, a separate receiver and transmitter, etc.) that enables device 400 to communicate with other devices, such as via a wired connection, a wireless connection, or a combination of wired and wireless connections. Communication interface 414 may permit device 400 to receive information from another device and/or provide information to another device. For example, communication interface 414 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 400 may perform one or more processes described herein. Device 400 may perform these processes based on processor 404 executing software instructions stored by a computer-readable medium, such as memory 406 and/or storage component 408. A computer-readable medium may include any non-transitory memory device. A memory device includes memory space located inside of a single physical storage device or memory space spread across multiple physical storage devices. Software instructions may be read into memory 406 and/or storage component 408 from another computer-readable medium or from another device via communication interface 414. When executed, software instructions stored in memory 406 and/or storage component 408 may cause processor 404 to perform one or more processes described herein. Additionally or alternatively, hardwired circuitry may be used in place of or in combination with software instructions to perform one or more processes described herein. Thus, embodiments described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

Figure 8A:
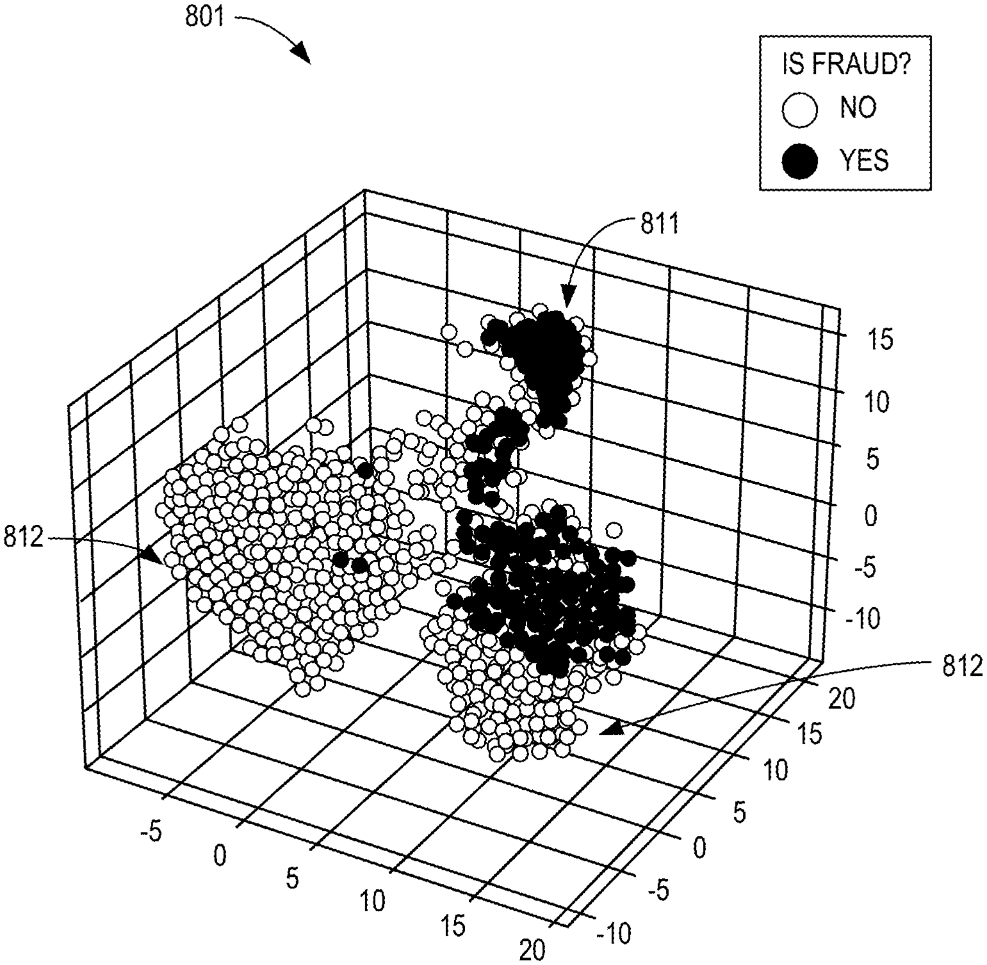
FIGS. 8A-8C are graphs of outputs of example implementations of systems and methods for a transformer machine learning model that is data type aware for sequential datasets, according to some non-limiting embodiments or aspects.
Figure 8B:
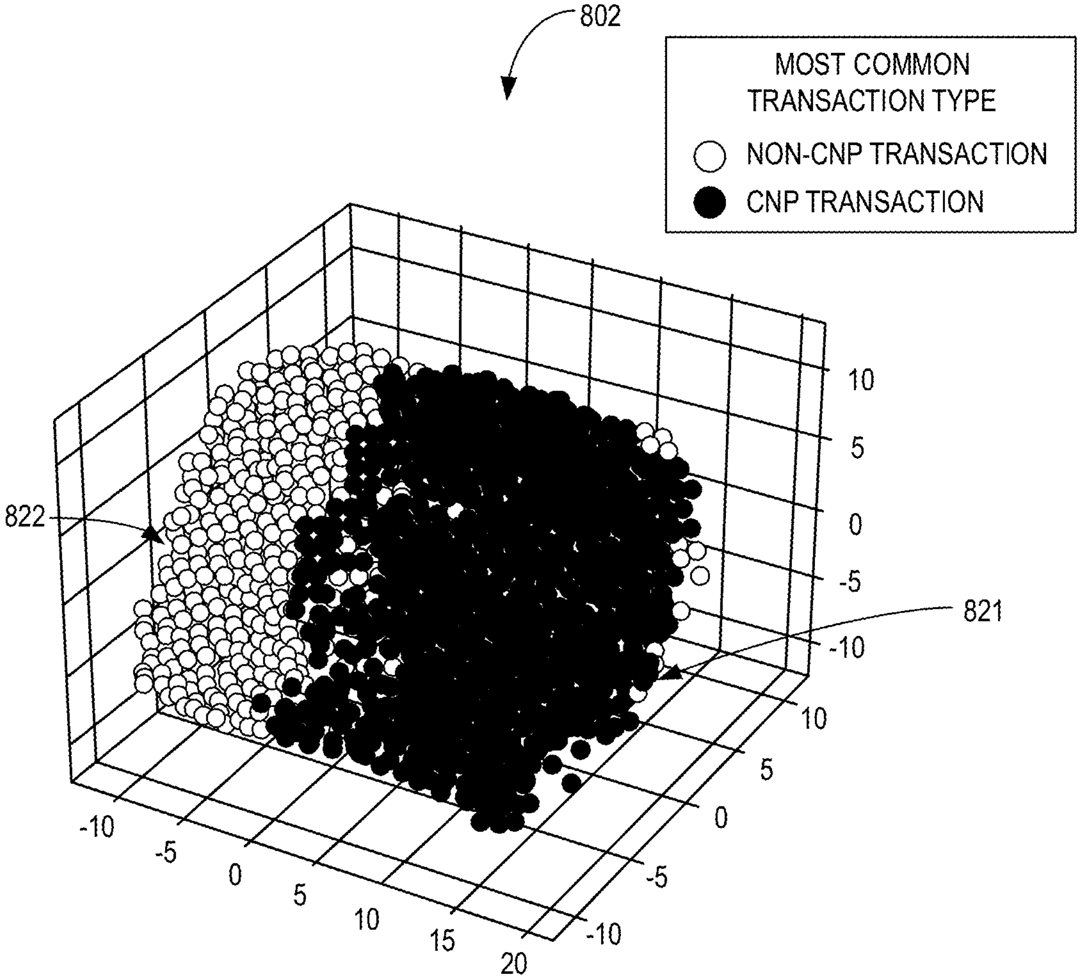
Figure 8C:
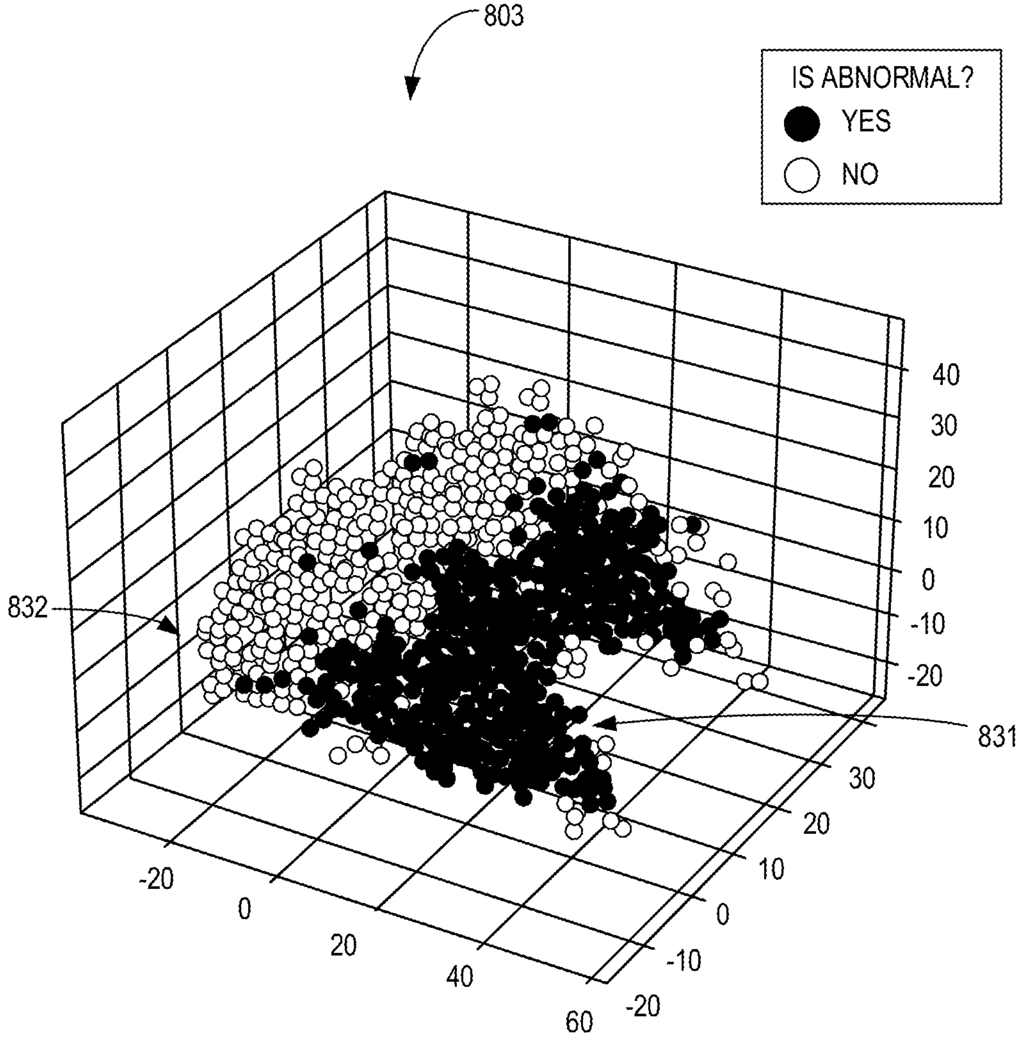

Referring now to FIGS. 8A-8C, shown are graphs of outputs of example implementations of systems and methods for a transformer machine learning model that is data type aware for sequential datasets, according to some non-limiting embodiments or aspects.

As shown in FIG. 8A, scatter plot 801 may include dots for fraudulent transactions 811 and non-fraudulent transactions 812. For example, each dot may represent the first three principal components (e.g., based on Principal Component Analysis (PCA)) of concatenated sequence embeddings (e.g., based on concatenating the static sequence embedding representation and dynamic sequence embedding representations) of a windowed transaction sequence (e.g., a transaction sequence including a given transaction and a selected number of previous transactions). These sequence embeddings may be generated after pretraining the transformers, as described herein (e.g., without explicitly finetuning a fraud detection model). As shown in FIG. 8A, there may be a relatively clear separation between fraudulent transactions 811 and non-fraudulent transactions 812, indicating that the sequence embeddings have captured this information (e.g., even without finetuning).

As shown in FIG. 8B, scatter plot 802 may include dots for card-not-present (CNP) sequences 821 (e.g., sequences with CNP as the most frequent type of transaction) and non-CNP sequences 822 (e.g., sequences with non-CNP as the most frequent type of transaction). For example, each dot may represent the first three principal components (e.g., based on PCA) of concatenated sequence embeddings (e.g., based on concatenating the static sequence embedding representation and dynamic sequence embedding representations) of a windowed transaction sequence (e.g., a transaction sequence including a given transaction and a selected number of previous transactions). These sequence embeddings may be generated after pretraining the transformers, as described herein (e.g., without explicitly finetuning a classifier model). As shown in FIG. 8B, there may be a relatively clear separation between CNP sequences 821 and non-CNP sequences 822, indicating that the sequence embeddings have captured this information (e.g., even without finetuning).

As shown in FIG. 8C, scatter plot 803 may include dots for abnormal transactions 831 and normal transactions 832. For example, each dot may represent the first three principal components (e.g., based on PCA) of concatenated sequence embeddings (e.g., based on concatenating the static sequence embedding representation and dynamic sequence embedding representations) of a windowed transaction sequence (e.g., a transaction sequence including a given transaction and a selected number of previous transactions). These sequence embeddings may be generated after pretraining the transformers, as described herein (e.g., without explicitly finetuning an anomaly detection model). As shown in FIG. 8C, there may be a relatively clear separation between abnormal transactions 831 and normal transactions 832, indicating that the sequence embeddings have captured this information (e.g., even without finetuning).

Table 1 shows a comparison of the area under curve (AUC) for an implementation of the disclosed subject matter (e.g., FATA-Trans) and three other types of machine learning models (e.g., light gradient-boosting machine (LightGBM), a recurrent neural network (RNN), and Tabular Bidirectional Encoder Representations from Transformers (TabBERT)) based on the same dataset (e.g., a synthetic transaction dataset).

TABLE 1

| Model | AUC |
|---|---|
| LightGBM | 0.9624 |
| RNN | 0.9866 |
| TabBERT | 0.9985 |
| FATA-Trans | 0.9992 |

As shown in Table 1, FATA-Trans consistently outperforms other types of machine learning models. This indicates that FATA-Trans effectively captures more precise user behavior patterns by leveraging the time interval and field-type information incorporated within the specially designed embedding and transformer layers.

Table 2 shows a comparison of pretraining time for FATA-Trans compared to TabBERT based on the same dataset (e.g., a synthetic transaction dataset) and same hardware setup.

TABLE 2

| Model | Pretraining Time |
|---|---|
| TabBERT | 3d11h |
| FATA-Trans | 2d12h |

As shown in Table 2, FATA-Trans demonstrates significantly shorter pretraining times compared to TabBERT. This may be at least partially attributable to the fact that FATA-Trans avoids redundant repetition of static fields in the sequence and only inputs them into the static-field transformer. As a result, FATA-Trans reduces memory usage and substantially saves training time.

Table 3 shows a comparison of fraud detection tasks for FATA-Trans and TabBERT, as well as a modified version of TabBERT in which time-aware position embeddings are utilized (e.g., TabBERT-TP), and a modified version of FATA-Trans in which simple position embeddings are utilized instead of time-aware position embeddings (e.g., FATA-Trans-SO). Performance of a fraud detection task based on raw data without any pretrained model (e.g., N/A) is also included for comparison. Two different types of classifier models were tested: multi-layer perception (MLP) and bidirectional long short-term memory (Bi-LSTM).

TABLE 3

| Pretraining Method | Classification Network | Embedding for Use | AUC |
|---|---|---|---|
| N/A | MLP | Raw fields | 0.8097 |
| TabBERT | MLP | Last seq. embed. | 0.8148 |
| TabBERT | Bi-LSTM | Seq. embeds. | 0.8884 |
| TabBERT-TP | MLP | Last seq. embed. | 0.8419 |
| TabBERT-TP | Bi-LSTM | Seq. embeds. | 0.8959 |
| FATA-Trans-SO | MLP | Last seq. embed. | 0.8199 |
| FATA-Trans-SO | Bi-LSTM | Seq. embeds. | 0.8944 |
| FATA-Trans | MLP | Last seq. embed. | 0.8319 |
| FATA-Trans | Bi-LSTM | Seq. embeds. | 0.8839 |

As shown in Table 3, FATA-Trans-SO, TabBERT-TP, and FATA-Trans show improvement in AUC score compared with using raw fields. Also, FATA-Trans-SO, TabBERT-TP, and FATA-Trans outperform the original TabBERT in most instances.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method for management of sequential transactions using a transformer management system, comprising:

receiving, with at least one processor of a transformer management system, sequential transaction data associated with a plurality of sequential transactions, the sequential transaction data comprising a plurality of transaction records, wherein the sequential transaction data comprises a plurality of field types of structured data and each field has a value, wherein the sequential transaction data comprises a time and an order of each transaction of the plurality of sequential transactions;

separating, with the at least one processor, for each transaction record of the plurality of transaction records, a plurality of static fields and a plurality of dynamic fields, wherein each static field of the plurality of static fields comprises a respective value that is replicated in every transaction record of the plurality of transaction records, wherein each dynamic field of the plurality of dynamic fields comprises a value for at least one transaction record of the plurality of transaction records different than another value for the dynamic field of at least one other transaction record of the plurality of transaction records;

inserting, with the at least one processor, a separator token separating the plurality of static fields from the plurality of dynamic fields;

generating, with the at least one processor, for each transaction record, as an output of a first transformer model of the transformer management system, a static transaction embedding representation based on inputting static field data associated with the plurality of static fields to the first transformer model, wherein the first transformer model comprises at least one first self-attention mechanism;

generating, with the at least one processor, for each transaction record, as outputs of a second transformer model of the transformer management system, a plurality of dynamic transaction embedding representations based on inputting dynamic field data associated with the plurality of dynamic fields of a sequence of transaction records to the second transformer model, wherein the second transformer model comprises at least one second self-attention mechanism, the sequence of transaction records comprising at least a subset of the plurality of transaction records;

generating, with the at least one processor, a first field-type embedding representation associated with the plurality of static fields, a second field-type embedding representation associated with the plurality of dynamic fields, a first time-and-position-based embedding representation associated with the plurality of static fields, and a plurality of time-and-position-based embedding representations associated with the plurality of dynamic fields;

generating, with the at least one processor, a first intermediate output based on the static transaction embedding representation, the first time-and-position-based embedding representation, and the first field-type embedding representation;

generating, with at least one processor, a plurality of second intermediate outputs based on each dynamic transaction embedding representation, a respective time-and-position-based embedding representation of the plurality of time-and-position-based embedding representations, and the second field-type embedding representation;

generating, with the at least one processor, for each transaction record, as an output of a third transformer model of the transformer management system, a static sequence embedding representation based on inputting the first intermediate output to the third transformer model, wherein the third transformer model comprises at least one third self-attention mechanism;

generating, with at least one processor, for each transaction record, as outputs of the third transformer model of the transformer management system, a plurality of dynamic sequence embedding representations based on inputting the plurality of second intermediate outputs to the third transformer model; and generating, with at least one processor, at least one prediction based on inputting the static sequence embedding representation and the plurality of dynamic sequence embedding representations to a classifier model.

2. The computer-implemented method of claim 1, wherein generating the first intermediate output comprises:

combining the static transaction embedding representation, the first time-and-position-based embedding representation, and the first field-type embedding representation associated with the plurality of static fields.

3. The computer-implemented method of claim 1, wherein generating the plurality of dynamic transaction embedding representations comprises:

generating a first dynamic transaction embedding associated with a first transaction record based on inputting first dynamic field data associated with the plurality of dynamic fields of the first transaction record to the second transformer model; and generating a second dynamic transaction embedding associated with a second transaction record based on inputting second dynamic field data associated with the plurality of dynamic fields of the second transaction record to the second transformer model;

the computer-implemented method further comprising:

generating a time-and-position-based embedding representation associated with the first transaction record; and generating a second time-and-position-based embedding representation associated with the second transaction record; and wherein generating the plurality of second intermediate outputs comprises:

combining the first dynamic transaction embedding, the time-and-position-based embedding representation, and the second field-type embedding representation associated with the plurality of dynamic fields; and combining the second dynamic transaction embedding, the second time-and-position-based embedding representation, and the second field-type embedding representation associated with the plurality of dynamic fields.

4. The computer-implemented method of claim 3, wherein combining the first dynamic transaction embedding, the time-and-position-based embedding representation, and the second field-type embedding representation associated with the plurality of dynamic fields comprises:

summing the first dynamic transaction embedding, the time-and-position-based embedding representation, and the second field-type embedding representation associated with the plurality of dynamic fields; and wherein combining the second dynamic transaction embedding, the second time-and-position-based embedding representation, and the second field-type embedding representation associated with the plurality of dynamic fields comprises:

summing the second dynamic transaction embedding, the second time-and-position-based embedding representation, and the second field-type embedding representation associated with the plurality of dynamic fields.

5. The computer-implemented method of claim 1, further comprising:

generating a first input for the first transformer model based on the static field data associated with the plurality of static fields; and generating a second input for the second transformer model based on the dynamic field data associated with the plurality of dynamic fields.

6. The computer-implemented method of claim 1, further comprising:

masking an original value of a dynamic field of a first transaction record of the sequence of transaction records to provide a masked dynamic field of the first transaction record prior to inputting dynamic field data associated with the plurality of dynamic fields of the sequence of transaction records to the second transformer model;

wherein generating the plurality of dynamic transaction embedding representations based on inputting the dynamic field data associated with the plurality of dynamic fields of the sequence of transaction records to the second transformer model comprises:

generating the plurality of dynamic transaction embedding representations based on inputting the masked dynamic field of the first transaction record to the second transformer model; and wherein the computer-implemented method further comprises:

training the third transformer model by comparing a data value of a data field of a dynamic sequence embedding representation associated with the first transaction record provided by the third transformer model with the original value of the dynamic field of the first transaction record and adjusting a parameter of the third transformer model based on comparing the data value of the data field of the dynamic sequence embedding representation associated with the first transaction record provided by the third transformer model with the original value of the dynamic field of the first transaction record.

7. The computer-implemented method of claim 1, further comprising:

performing an action associated with a fraud detection task based on the at least one prediction.

8. A system for management of sequential transactions, comprising:

a transformer management system comprising at least one processor configured to:

receive sequential transaction data associated with a plurality of sequential transactions, the sequential transaction data comprising a plurality of transaction records, wherein the sequential transaction data comprises a plurality of field types of structured data and each field has a value, wherein the sequential transaction data comprises a time and an order of each transaction of the plurality of sequential transactions;

separate, for each transaction record of the plurality of transaction records, a plurality of static fields and a plurality of dynamic fields, wherein each static field of the plurality of static fields comprises a respective value that is replicated in every transaction record of the plurality of transaction records, wherein each dynamic field of the plurality of dynamic fields comprises a value for at least one transaction record of the plurality of transaction records different than another value for the dynamic field of at least one other transaction record of the plurality of transaction records;

insert a separator token separating the plurality of static fields from the plurality of dynamic fields;

generate for each transaction record, as an output of a first transformer model of the transformer management system, a static transaction embedding representation based on inputting static field data associated with the plurality of static fields to the first transformer model, wherein the first transformer model comprises at least one first self-attention mechanism;

generate for each transaction record, as outputs of a second transformer model of the transformer management system, a plurality of dynamic transaction embedding representations based on inputting dynamic field data associated with the plurality of dynamic fields of a sequence of transaction records to the second transformer model, wherein the second transformer model comprises at least one second self-attention mechanism, the sequence of transaction records comprising at least a subset of the plurality of transaction records;

generate a first field-type embedding representation associated with the plurality of static fields, a second field-type embedding representation associated with the plurality of dynamic fields, a first time-and-position-based embedding representation associated with the plurality of static fields, and a plurality of time-and-position-based embedding representations associated with the plurality of dynamic fields;

generate a first intermediate output based on the static transaction embedding representation, the first time-and-position-based embedding representation, and the first field-type embedding representation;

generate a plurality of second intermediate outputs based on each dynamic transaction embedding representation, a respective time-and-position-based embedding representation of the plurality of time-and-position-based embedding representations, and the second field-type embedding representation;

generate for each transaction record, as an output of a third transformer model of the transformer management system, a static sequence embedding representation based on inputting the first intermediate output to the third transformer model, wherein the third transformer model comprises at least one third self-attention mechanism;

generate for each transaction record, as outputs of the third transformer model of the transformer management system, a plurality of dynamic sequence embedding representations based on inputting the plurality of second intermediate outputs to the third transformer model; and generate at least one prediction based on inputting the static sequence embedding representation and the plurality of dynamic sequence embedding representations to a classifier model.

9. The system of claim 8, wherein generating the first intermediate output comprises:

combining the static transaction embedding representation, the first time-and-position-based embedding representation, and the first field-type embedding representation associated with the plurality of static fields.

10. The system of claim 8, wherein generating the plurality of dynamic transaction embedding representations comprises:

generating a first dynamic transaction embedding associated with a first transaction record based on inputting first dynamic field data associated with the plurality of dynamic fields of the first transaction record to the second transformer model; and generating a second dynamic transaction embedding associated with a second transaction record based on inputting second dynamic field data associated with the plurality of dynamic fields of the second transaction record to the second transformer model; and wherein the at least one processor is further configured to:

generate a time-and-position-based embedding representation associated with the first transaction record; and generate a second time-and-position-based embedding representation associated with the second transaction record; and wherein generating the plurality of second intermediate outputs comprises:

combining the first dynamic transaction embedding, the time-and-position-based embedding representation, and the second field-type embedding representation associated with the plurality of dynamic fields; and combining the second dynamic transaction embedding, the second time-and-position-based embedding representation, and the second field-type embedding representation associated with the plurality of dynamic fields.

11. The system of claim 10, wherein combining the first dynamic transaction embedding, the time-and-position-based embedding representation, and the second field-type embedding representation associated with the plurality of dynamic fields comprises:

summing the first dynamic transaction embedding, the time-and-position-based embedding representation, and the second field-type embedding representation associated with the plurality of dynamic fields; and wherein combining the second dynamic transaction embedding, the second time-and-position-based embedding representation, and the second field-type embedding representation associated with the plurality of dynamic fields comprises:

summing the second dynamic transaction embedding, the second time-and-position-based embedding representation, and the second field-type embedding representation associated with the plurality of dynamic fields.

12. The system of claim 8, wherein the at least one processor is further configured to:

generate a first input for the first transformer model based on the static field data associated with the plurality of static fields; and generate a second input for the second transformer model based on the dynamic field data associated with the plurality of dynamic fields.

13. The system of claim 8, wherein the at least one processor is further configured to:

mask an original value of a dynamic field of a first transaction record of the sequence of transaction records to provide a masked dynamic field of the first transaction record prior to inputting dynamic field data associated with the plurality of dynamic fields of the sequence of transaction records to the second transformer model;

wherein generating the plurality of dynamic transaction embedding representations based on inputting the dynamic field data associated with the plurality of dynamic fields of the sequence of transaction records to the second transformer model comprises:

generating the plurality of dynamic transaction embedding representations based on inputting the masked dynamic field of the first transaction record to the second transformer model; and wherein the at least one processor is further configured to:

train the third transformer model by comparing a data value of a data field of a dynamic sequence embedding representation associated with the first transaction record provided by the third transformer model with the original value of the dynamic field of the first transaction record and adjusting a parameter of the third transformer model based on comparing the data value of the data field of the dynamic sequence embedding representation associated with the first transaction record provided by the third transformer model with the original value of the dynamic field of the first transaction record.

14. The system of claim 8, wherein the at least one processor is further configured to:

perform an action associated with a fraud detection task based on the at least one prediction.

15. A computer program product for management of sequential transactions using a transformer management system comprising at least one non-transitory computer-readable medium including program instructions that, when executed by at least one processor, cause the at least one processor to:

receive sequential transaction data associated with a plurality of sequential transactions, the sequential transaction data comprising a plurality of transaction records, wherein the sequential transaction data comprises a plurality of field types of structured data and each field has a value, wherein the sequential transaction data comprises a time and an order of each transaction of the plurality of sequential transactions;

separate, for each transaction record of the plurality of transaction records, a plurality of static fields and a plurality of dynamic fields, wherein each static field of the plurality of static fields comprises a respective value that is replicated in every transaction record of the plurality of transaction records, wherein each dynamic field of the plurality of dynamic fields comprises a value for at least one transaction record of the plurality of transaction records different than another value for the dynamic field of at least one other transaction record of the plurality of transaction records;

insert a separator token separating the plurality of static fields from the plurality of dynamic fields;

generate for each transaction record, as an output of a first transformer model of the transformer management system, a static transaction embedding representation based on inputting static field data associated with the plurality of static fields to the first transformer model, wherein the first transformer model comprises at least one first self-attention mechanism;

generate for each transaction record, as outputs of a second transformer model of the transformer management system, a plurality of dynamic transaction embedding representations based on inputting dynamic field data associated with the plurality of dynamic fields of a sequence of transaction records to the second transformer model, wherein the second transformer model comprises at least one second self-attention mechanism, the sequence of transaction records comprising at least a subset of the plurality of transaction records;

generate a first field-type embedding representation associated with the plurality of static fields, a second field-type embedding representation associated with the plurality of dynamic fields, a first time-and-position-based embedding representation associated with the plurality of static fields, and a plurality of time-and-position-based embedding representations associated with the plurality of dynamic fields;

generate a first intermediate output based on the static transaction embedding representation, the first time-and-position-based embedding representation, and the first field-type embedding representation;

generate a plurality of second intermediate outputs based on each dynamic transaction embedding representation, a respective time-and-position-based embedding representation of the plurality of time-and-position-based embedding representations, and the second field-type embedding representation;

generate for each transaction record, as an output of a third transformer model of the transformer management system, a static sequence embedding representation based on inputting the first intermediate output to the third transformer model, wherein the third transformer model comprising at least one third self-attention mechanism;

generate for each transaction record, as outputs of the third transformer model of the transformer management system, a plurality of dynamic sequence embedding representations based on inputting the plurality of second intermediate outputs to the third transformer model; and generate at least one prediction based on inputting the static sequence embedding representation and the plurality of dynamic sequence embedding representations to a classifier model.

16. The computer program product of claim 15, wherein generating the first intermediate output comprises:

combining the static transaction embedding representation, the first time-and-position-based embedding representation, and the first field-type embedding representation associated with the plurality of static fields.

17. The computer program product of claim 15, wherein generating the plurality of dynamic transaction embedding representations comprises:

generating a first dynamic transaction embedding associated with a first transaction record based on inputting first dynamic field data associated with the plurality of dynamic fields of the first transaction record to the second transformer model; and generating a second dynamic transaction embedding associated with a second transaction record based on inputting second dynamic field data associated with the plurality of dynamic fields of the second transaction record to the second transformer model;

wherein the instructions, when executed by the at least one processor, further cause the at least one processor to:

generate a time-and-position-based embedding representation associated with the first transaction record; and generate a second time-and-position-based embedding representation associated with the second transaction record;

wherein generating the plurality of second intermediate outputs comprises:

combining the first dynamic transaction embedding, the time-and-position-based embedding representation, and the second field-type embedding representation associated with the plurality of dynamic fields; and combining the second dynamic transaction embedding, the second time-and-position-based embedding representation, and the second field-type embedding representation associated with the plurality of dynamic fields;

wherein combining the first dynamic transaction embedding, the time-and-position-based embedding representation, and the second field-type embedding representation associated with the at least one dynamic field plurality of dynamic fields comprises:

summing the first dynamic transaction embedding, the time-and-position-based embedding representation, and the second field-type embedding representation associated with the plurality of dynamic fields; and wherein combining the second dynamic transaction embedding, the second time-and-position-based embedding representation, and the second field-type embedding representation associated with the plurality of dynamic fields comprises:

summing the second dynamic transaction embedding, the second time-and-position-based embedding representation, and the second field-type embedding representation associated with the plurality of dynamic fields.

18. The computer program product of claim 15, wherein the instructions, when executed by the at least one processor, further cause the at least one processor to:

generate a first input for the first transformer model based on the static field data associated with the plurality of static fields; and generate a second input for the second transformer model based on the dynamic field data associated with the plurality of dynamic fields.

19. The computer program product of claim 15, wherein the instructions, when executed by the at least one processor, further cause the at least one processor to:

mask an original value of a dynamic field of a first transaction record of the sequence of transaction records to provide a masked dynamic field of the first transaction record prior to inputting dynamic field data associated with the plurality of dynamic fields of the sequence of transaction records to the second transformer model;

wherein generating the plurality of dynamic transaction embedding representations based on inputting the dynamic field data associated with the plurality of dynamic fields of the sequence of transaction records to the second transformer model comprises:

generating the plurality of dynamic transaction embedding representations based on inputting the masked dynamic field of the first transaction record to the second transformer model; and wherein the instructions, when executed by the at least one processor, further cause the at least one processor to:

train the third transformer model by comparing a data value of a data field of a dynamic sequence embedding representation associated with the first transaction record provided by the third transformer model with the original value of the dynamic field of the first transaction record and adjusting a parameter of the third transformer model based on comparing the data value of the data field of the dynamic sequence embedding representation associated with the first transaction record provided by the third transformer model with the original value of the dynamic field of the first transaction record.

20. The computer program product of claim 15, wherein the instructions, when executed by the at least one processor, further cause the at least one processor to:

perform an action associated with a fraud detection task based on the at least one prediction.

* * * * *